United States Patent
Hsiao et al.

(10) Patent No.: US 11,275,730 B2
(45) Date of Patent: *Mar. 15, 2022

(54) AUTOMATED DATA ANALYSIS USING COMBINED QUERIES

(71) Applicant: Oracle International Corporation, Redwood Shores, CA (US)

(72) Inventors: Eric Hsiao, San Mateo, CA (US); James Dang, Union City, CA (US); Jeffrey Toillion, Half Moon Bay, CA (US); Rahul V. Herwadkar, Foster City, CA (US); Leon Zeng, Shenzhen (CN); Xiaochao Zhou, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 16/441,921

(22) Filed: Jun. 14, 2019

(65) Prior Publication Data

US 2019/0303367 A1 Oct. 3, 2019

Related U.S. Application Data

(63) Continuation of application No. 15/334,159, filed on Oct. 25, 2016, now Pat. No. 10,394,801.

(Continued)

(51) Int. Cl.
*G06F 16/242* (2019.01)
*G06F 3/0482* (2013.01)
(Continued)

(52) U.S. Cl.
CPC ........ *G06F 16/2425* (2019.01); *G06F 3/0482* (2013.01); *G06F 16/248* (2019.01);
(Continued)

(58) Field of Classification Search
CPC ............ G06F 16/2425; G06F 16/2428; G06F 16/248; G06F 3/0482; G06Q 10/00; G06Q 10/06

See application file for complete search history.

(56) References Cited

U.S. PATENT DOCUMENTS 7,062,749 B2 6/2006 Cyr et al.
7,603,674 B2 10/2009 Cyr et al.
(Continued)

OTHER PUBLICATIONS

Oracle® Fusion Middleware, User's Guide for Oracle Business Activity Monitoring, 11g Release 1 (11.1.1.7), E10230-09, Feb. 2013, 232 pages.

(Continued)

*Primary Examiner* — Truong V Vo
(74) *Attorney, Agent, or Firm* — Kilpatrick Townsend & Stockton LLP

(57) ABSTRACT

A data analysis system is provided that enables users to perform complex data analyses based upon data that may be spread across multiple data sources. The data analysis system is configured to generate a combined query that is capable of extracting data from the multiple data sources. The user may provide analysis information describing the analysis the user desires to perform on the extracted data. In response, the data analysis system is further configured to automatically augment the combined query with program or code to implement the user-specified analysis. Execution of the augmented or modified combined query generates an analysis result set resulting from performing the user-specified analysis. The data analysis system provides a flexible and easy-to-use platform for a user, even a non-technical user, to perform complex data analyses using data stored in multiple different data sources.

20 Claims, 15 Drawing Sheets

Related U.S. Application Data

(60) Provisional application No. 62/251,559, filed on Nov. 5, 2015.

(51) Int. Cl.
*G06F 16/248* (2019.01)
*G06Q 10/00* (2012.01)
*G06Q 10/06* (2012.01)

(52) U.S. Cl.
CPC ......... *G06F 16/2428* (2019.01); *G06Q 10/00* (2013.01); *G06Q 10/06* (2013.01)

(56) References Cited

U.S. PATENT DOCUMENTS

| | | |
|---|---|---|
| 8,046,747 B2 | 10/2011 | Cyr et al. |
| 2013/0339379 A1 | 12/2013 | Ferrari et al. |
| 2016/0224642 A1* | 8/2016 | Miller ................. G06F 16/2477 |

OTHER PUBLICATIONS

Oracle® Fusion Middleware, Monitoring Business Activity with Oracle BAM, 12c (12.2.1) E59338-02, Nov. 2015, 26 pages.
Oracle® Fusion Middleware, Monitoring Business Activity with Oracle BAM, 12c (12.1.3) E28464-05, Jul. 2015, 28 pages.
U.S. Appl. No. 15/334,159, Non-Final Office Action dated Feb. 1, 2019, 14 pages.
U.S. Appl. No. 15/334,159, Notice of Allowance dated May 31, 2019, 8 pages.

\* cited by examiner

EasternRegionQuery ×

Create query based upon defined SQL   Yes

*Data Object  SALES_EASTERN_REGION   — 202

Select fields from the list.

- SALES_DATE
- NY
- DC

— 204

— 206

Filters   — 208

☐ Select All  < >

All are true

☐ Top N

◉ ✎ SQL

SELECT * FROM ( SELECT SALES_DATE AS SALES_DATE, NY AS NY, DC AS DC FROM BEAM_VIEW_50 )
WHERE ROWNUM <= 10240

— 210

Save

```
                                    ┌─ 400
SELECT * FROM
        ┌   (SELECT EXTRACT(YEAR FROM SALES_DATE) AS
        │   YEAR_SALES_DATE,
        │
        │       EXTRACT(MONTH FROM SALES_DATE) AS
        │   MONTH_SALES_DATE,
        │
   402 ─┤       SUM(NY) AS SUMNY,
        │
        │       SUM(SF) AS SUMSF,
        │
        │       SUM(LA) AS SUMLA,
        │
        └       SUM(DC) AS SUMDC

FROM

┌   (select SALES_DATE, LA, SF, NY, DC from
              │
              │       (select SALES_DATE, LA, SF, 0 as NY, 0 as DC
              │   from
              │
              │       (SELECT SALES_DATE AS SALES_DATE, LA AS
              │   LA, SF AS SF
              │
    BASE      │       FROM BEAM_VIEW_48)
  COMBINED ───┤
    QUERY     │   UNION ALL
              │
              │       select SALES_DATE, 0 as LA, 0 as SF, NY, DC
              │   from
              │
              │       (SELECT SALES_DATE AS SALES_DATE, NY
              │   AS NY, DC AS DC
              │
              │       FROM BEAM_VIEW_50)
              │
              └   )

) BAMOPQ1

┌   GROUP BY EXTRACT(YEAR FROM SALES_DATE),
        │   EXTRACT(MONTH FROM SALES_DATE)
   404 ─┤
        │   ORDER BY EXTRACT(YEAR FROM SALES_DATE)
        └   ASC , EXTRACT(MONTH FROM SALES_DATE) ASC

) WHERE ROWNUM <= 10240
```

SELECT NAME, DISPLAY_NAME, COMPENSATION
FROM
    (SELECT NAME                       AS NAME,
           NAME || ', Employee #' ||EMPLOYEE_ID    AS DISPLAY_NAME,
           SALARY                      AS COMPENSATION
    FROM MOBILE_EMP)
UNION ALL
    (SELECT NAME                       AS NAME,
           NAME || ', Employee #' || EMPLOYEE_ID   AS DISPLAY_NAME,
           SALARY                      AS COMPENSATION
    FROM CLOUD_EMP)
UNION ALL
    (SELECT FULLNAME                   AS NAME,
           FULLNAME || ', Employee #' || EMP_ID    AS DISPLAY_NAME,
           SALARY + BONUS_Q1 + BONUS_Q2            AS COMPENSATION
    FROM SALES_EMPLOYEES)
UNION ALL
    (SELECT NAME                       AS NAME,
           NAME || ', Contractor #' || CONTRACTOR_ID  AS DISPLAY_NAME,
           TOTAL                       AS COMPENSATION
    FROM CONTRACTOR_1099)
```

*FIG. 5*

```
SELECT DISPLAY_NAME, COMPENSATION FROM (
    SELECT DISPLAY_NAME, COMPENSATION FROM (
        SELECT NAME, DISPLAY_NAME, COMPENSATION FROM
            (SELECT NAME                          AS NAME,
                NAME || ', Employee #' ||EMPLOYEE_ID    AS DISPLAY_NAME,
                SALARY                            AS COMPENSATION
             FROM MOBILE_EMP)
        UNION ALL
            (SELECT NAME                          AS NAME,
                NAME || ', Employee #' || EMPLOYEE_ID   AS DISPLAY_NAME,
                SALARY                            AS COMPENSATION
             FROM CLOUD_EMP)
        UNION ALL
            (SELECT FULLNAME                      AS NAME,
                FULLNAME || ', Employee #' || EMP_ID    AS DISPLAY_NAME,
                SALARY + BONUS_Q1 + BONUS_Q2      AS COMPENSATION
             FROM SALES_EMPLOYEES)
        UNION ALL
            (SELECT NAME                          AS NAME,
                NAME || ', Contractor #' || CONTRACTOR_ID  AS DISPLAY_NAME,
                TOTAL                             AS COMPENSATION)
    )
    ORDER BY COMPENSATION DESC
)
WHERE ROWNUM <= 10
```

600 (arrow pointing to outer query)
602 (bracket encompassing the union subqueries)

```
SELECT
    REGION AS REGION,
    SUM(SALES) AS SUMSALES
FROM $[do(FilmSales)]
WHERE
(      ($[rls(FilmSales)])
   AND (Region=$[parm(Region)])
   AND (State=$[parm(State)])
)
GROUP BY REGION
ORDER BY REGION ASC
```

*FIG. 10*

AUTOMATED DATA ANALYSIS USING COMBINED QUERIES

CROSS-REFERENCES TO RELATED APPLICATIONS

The present application is a continuation application of U.S. Non-Provisional application Ser. No. 15/334,159, filed Oct. 25, 2016, entitled "AUTOMATED DATA ANALYSIS USING COMBINED QUERIES", which is a non-provisional of and claims the benefit and priority under 35 U.S.C. 119(e) of U.S. Provisional Application No. 62/251,559, filed Nov. 5, 2015, entitled "COMBINED QUERY", the entire contents of which are incorporated herein by reference for all purposes.

BACKGROUND

The present disclosure relates to analysis of data, and more particularly to automated techniques for enabling analysis of data stored in multiple data sources.

The field of data analysis has traditionally been restricted to those with technical capabilities. The data analyst has to have technical knowhow as to how to retrieve the data to be analyzed from its storage location and program the analysis techniques. The problem is further aggravated if the data to be analyzed is stored across multiple data sources. For example, if the data to be analyzed is stored in multiple database systems, the data analyst has to know how to query and manipulate the data from the databases using a data management language such as a Structured Query Language (SQL). Additionally, the data analyst has to be well versed in writing complex queries (e.g., SQL queries) for performing the desired analysis on the retrieved data.

In recent times, data analysis is more and more being performed by business users who have very little to no technical skills. Various graphical user interface (GUI) based tools such as dashboards are being provided to enable these non-technical business users to perform data analysis. While these tools can be used by the business users, the data analysis logic provided by the tool is typically hardcoded into the tool by the engineering team supporting the tool. If a business user wants to change the analysis being performed by the tool, the change information has to be conveyed to the engineering team, which then has to change the code for the tool per the new requirements. A new version of the tool incorporating the code changes is then released and published to the business user for use. This however requires a lot of turnaround time and severely limits the flexibility of the analysis that can be performed by the business user.

BRIEF SUMMARY

The present disclosure relates to analysis of data, and more particularly to automated techniques for enabling analysis of data stored in multiple data sources.

The present disclosure describes a data analysis system that enables users to perform complex data analyses based upon data from multiple data sources. In certain embodiments, the data analysis system enables a business user to perform the analysis without having to have any technical knowhow related to writing queries for extracting data from the multiple data sources or writing programs to perform the analysis. The data analysis system is able to automatically generate the queries for extraction of data from the multiple data sources based upon high-level user-provided information. Further, the data analysis system is also capable of generating the program or code for analyzing the data based upon user inputs describing the analysis to be performed. The data analysis system thus provides a flexible and easy-to-use platform for a user, even a non-technical user, to perform complex data analyses using data stored in multiple different data sources.

In certain embodiments, a data analysis system is provided that enables users to perform complex data analyses based upon data that may be spread across multiple data sources. The data analysis system is configured to generate a combined query that is capable of extracting data from the multiple data sources. The user may provide analysis information describing the analysis the user desires to perform on the extracted data. In response, the data analysis system is further configured to automatically augment the combined query with program or code to implement the user-specified analysis. Execution of the augmented or modified combined query generates an analysis result set resulting from performing the user-specified analysis. The data analysis system provides a flexible and easy-to-use platform for a user, even a non-technical user, to perform complex data analyses using data stored in multiple different data sources.

In certain embodiments, a data analysis system may generate a base query based upon a first single source query for extracting first data from a first data source and a second single source query for extracting second data from a second data source, where the base query is able to extract the first data from the first data source and the second data from the second data source. The data analysis system may then obtain a result set by executing the base query, the result set comprising the first data and the second data. The data analysis system may then determine a set of metadata attributes for the result set and output the set of metadata attributes for the result set. In some embodiments, the result set may be stored as a memory object in a memory of the data analysis system. A user may then specify the analysis to be performed using the set of metadata attributes. For example, the data analysis system may receive first analysis information identifying a first analysis to be performed based upon the result set, the first analysis information indicating selection of one or more metadata attributes from the set of metadata attributes for the result set. The data analysis system may generate a first modified query based upon the base query and the first analysis information, and obtain a first analysis result set by executing the first modified query. The data analysis system may then output the first analysis result set to a user.

In certain embodiments, the data analysis system may receive second analysis information identifying a second analysis to be performed based upon the result set. The data analysis system may generate a second modified query based upon the base query and the second analysis information, and obtain a second analysis result set by executing the second modified query. The data analysis system may then output the second analysis result set. In this manner, multiple modified queries may be created for multiple analyses to be performed using the same base query.

In certain embodiments, as part of generating the base query, the data analysis system may validate the first and second single source queries by executing the first and second single source queries. Validation may include, for example, determining if the single source queries have valid syntax, the data sources corresponding to the single source queries can be accessed (e.g., if access permissions are okay), and the like.

In certain embodiments, as part of generating the base query, the data analysis system may determine a first metadata attribute for the first data and a first metadata attribute for the second data. The data analysis system may then determine that the first metadata attribute for the first data maps to the first metadata attribute for the second data. This mapping information, for example, may be provided by a user. The data analysis system then generates the base query such that the information indicative of the mapping is included in the base query.

There are various ways in which single source queries may be provided to the data analysis system. In certain embodiments, a user may identify a data source and provide a single source query for the data sources to the data analysis system. In some other embodiments, the data analysis system may facilitate generation of the single source query. For example, the data analysis system, upon receiving information identifying a data source, may determine a set of metadata attributes for the data source. The data analysis system may then output the set of metadata attributes for the data source to the user. The data analysis system may then receive user input indicative of selection of one or more metadata attributes from the set of metadata attributes for the data source. The data analysis system may then generate a single source query based upon the one or more metadata attributes selected from the set of metadata attributes for the data source.

The data sources themselves could be of various different kinds such as a table, a view, a file, and the like. The table or view may be from the same database or from different databases.

In certain embodiments, the set of metadata attributes determined for a result set may comprise a first metadata attribute identifying a first column of the result set. The data analysis system may receive first analysis information comprising information indicating selection of the first metadata attribute from the set of metadata attributes for the result set. The data analysis system may then generate the first modified query that includes the base query and information based upon the analysis information.

In certain embodiments, the set of metadata attributes determined for a result set may comprise a first metadata attribute identifying a first column of the result set and a second metadata attribute identifying a second column of the result set. As part of receiving the first analysis information, the data analysis system may receive information indicating that a visualization is to be generated, receive information indicating selection of the first metadata attribute from the set of metadata attributes for the result set as a dimension for the visualization, and receive information indicating selection of the second metadata attribute from the set of metadata attributes for the result set as a measure for the visualization. The data analysis system may then generate a visualization based upon the first analysis information and the result set, and output the generated visualization to a user.

In certain embodiments, the set of metadata attributes determined for a result set may comprise a first metadata attribute identifying a first column of the result set, a second metadata attribute identifying a second column of the result set, and a third metadata attribute identifying a third column of the result set. The data analysis system may output the set of metadata attributes for the result set via a graphical user interface (GUI). The data analysis system may receive first analysis information that comprises information indicating that a visualization is to be generated, the visualization comprising a first axis and a second axis. The first analysis information may also comprise information indicating selection of the first metadata attribute from the set of metadata attributes for the result set as a dimension for the first axis of the visualization. The first analysis information may also comprise information indicating selection of the second and third metadata attributes from the set of metadata attributes for the result set as measures for the second axis of the visualization. The data analysis system may then generate the visualization based upon the first analysis information and the result set, and output the generated visualization.

The foregoing, together with other features and embodiments will become more apparent upon referring to the following specification, claims, and accompanying drawings.

BRIEF DESCRIPTION OF THE DRAWINGS

FIG. 2 illustrates an exemplary GUI that may be provided by a data analysis system according to certain embodiments.

FIG. 4 depicts an example of a modified combined query that may be generated by a data analysis system in certain embodiments.

FIG. 5 depicts an exemplary base combined query generated by a data analysis system based upon the single source queries according to certain embodiments.

FIG. 6 shows an example of a modified combined query generated by a data analysis system based upon the base query depicted in FIG. 5.

FIG. 10 illustrates an example of a parameterized combined query according to certain embodiments.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to analysis of data, and more particularly to automated techniques for enabling analysis of data stored in multiple data sources.

The present disclosure describes a data analysis system that enables users to perform complex data analyses based upon data from multiple data sources. In certain embodiments, the data analysis system enables a business user to perform the analysis without having to have any technical knowhow related to writing queries for extracting data from the multiple data sources or writing programs to perform the analysis. The data analysis system is able to automatically generate the queries for extraction of data from the multiple data sources based upon high-level user-provided information. Further, the data analysis system is also capable of generating the program or code for analyzing of data based upon user inputs describing the analysis to be performed. The data analysis system thus provides a flexible and easy-to-use platform for a user, even a non-technical user, to perform complex data analyses using data stored in multiple different data sources.

A data analysis system is provided that enables users to perform complex data analyses based upon data that may be spread across multiple data sources. The data analysis system is configured to generate a combined query that is capable of extracting data from the multiple data sources. The user may provide analysis information describing the analysis the user desires to perform on the extracted data. In response, the data analysis system is further configured to automatically augment the combined query with program or code to implement the user-specified analysis. Execution of the augmented or modified combined query generates an analysis result set resulting from performing the user-specified analysis. The data analysis system provides a flexible and easy-to-use platform for a user, even a non-technical user, to perform complex data analyses using data stored in multiple different data sources.

Figure 1:
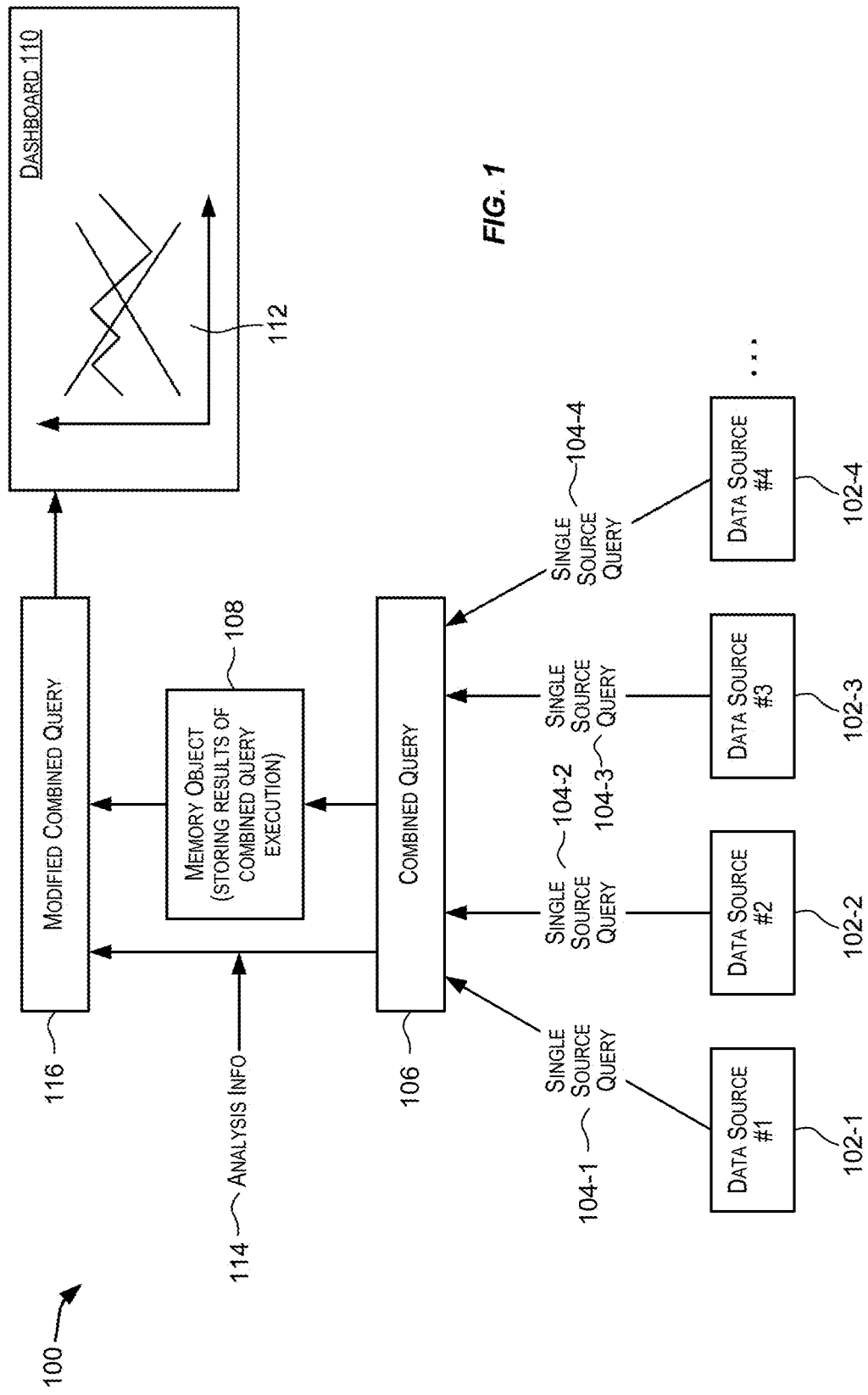
FIG. 1 shows a high-level diagram of a data analysis system that enables data analysis to be performed for data stored in multiple data sources according to certain embodiments.

FIG. 1 shows a high-level diagram of a data analysis system 100 that enables data analysis to be performed for data stored in multiple data sources according to certain embodiments. As shown in FIG. 1, the data to be analyzed may be stored in various data sources such as data sources 102-1, 102-2, 102-3, 102-4, etc. As a starting point, a user may identify the data sources where the data to be analyzed is stored. A single source query may then be provided for querying and retrieving data from each identified data source. A single source query is specific to a data source and used for extracting the relevant information from the data source. Multiple such single source queries may be provided to data analysis system 100 for querying and extracting data from the data sources. For example, as depicted in FIG. 1, a single source query 104-1 is provided for querying and extracting data from data source 102-1, a single source query 104-2 is provided for querying and extracting data from data source 102-2, a single source query 104-3 is provided for querying and extracting data from data source 102-3, and a single source query 104-4 is provided for querying and extracting data from data source 102-4.

Data analysis system 100 may provide various different ways for a user to identify a data source and provide a single source query for the data source. For example, in certain embodiments, data analysis system 100 may provide a graphical user interface (GUI) that enables the user to select data sources of interest, and then for each data source, specify information that is of interest to the user. Data analysis system 100 then uses the information input by the user to automatically generate a single source query for each data source identified by the user. In some other embodiments, the GUI may enable the user to identify a data source and manually provide a query (e.g., a SQL query) to be used for extracting data from that data source. For example, an "ad-hoc query" option may be provided, which when selected by the user, opens up a text field in which the user may enter the single source query for extracting data of interest from the data source. In this manner, data analysis system 100 allows the user complete flexibility in selecting the data sources storing data to be used for the analysis and, for each identified data source, to configure a single source query for the selected data source to extract data relevant for the analysis from that data source.

The data sources can be of different kinds including, but not limited to, a database, a view within a database, a table within a database, a file, and the like. For example, in FIG. 1, data source 102-1 could be a table in a first database, data source 102-2 could be a table in second database, data source 102-3 could be a table or view in a third database, data source 102-4 could be a file, and the like.

In certain embodiments, data analysis system 100 is configured to automatically generate a combined query based upon the multiple single source queries. For example, as depicted in FIG. 1, data analysis system 100 generates a combined query 106 based upon single source queries 104-1, 104-2, 104-3, and 104-4. The combined query combines the individual single source queries. The combined query that is generated for a set of single source queries is such that execution of the combined query causes data corresponding to each of the single source queries to be extracted from the corresponding data sources. For example, in FIG. 1, combined query 106 is generated in such a way that execution of combined query 106 causes data corresponding to single source queries 104-1, 104-2, 104-3, and 104-4 to be extracted from the corresponding data sources 102-1, 102-2, 102-3, and 102-4.

In certain embodiments, data analysis system 100 also performs metadata analysis for the single source queries and determines the metadata for the combined query. For example, if the data sources are tables or views, data analysis system 100 may determine various metadata attributes for each of the data sources. The metadata attributes for a data source may include, for example, the number of columns for the data source, names of the columns, datatypes associated with the columns, and other metadata attributes. Data analysis system 100 may then normalize the columns information across the data sources. Normalization may include, for example, determining commonality between the columns from the different data sources. For example, data analysis system 100 may determine that the first column in the first data source maps to the first column in the second data source (for example, if both the first columns store data related to a name of a person), and the like. The mapping information may be added to the combined query that is generated.

Data analysis system 100 may then cause combined query 106 to be executed. Execution of combined query 106 causes execution of each of the single source queries that are included in the combined query to be executed. Execution of the combined query thus causes data corresponding to the single source queries to be extracted from the multiple data sources. For purposes of this disclosure, the data obtained from executing a combined query is referred to as a result set. In certain embodiments, the result set data is stored as a memory object (also referred to as a virtual memory object) in a memory of data source 100. For example, as depicted in FIG. 1, the result set obtained from executing combined query 106 is stored in memory object 108.

The result set obtained from execution of the combined query may then be used to perform various different analyses. The results of the analyses may be output to the user in different ways. For example, the user may want to a specific analysis to be performed and the results of the analysis to be displayed using a visualization (e.g., a line graph), where the visualization is displayed on a dashboard used by the user. The single visualization may represent analysis performed on data extracted from multiple data sources. For example, as depicted in FIG. 1, the result set obtained from executing combined query 106 and stored in memory object 108 may be used to generate a single visualization 112 (e.g., a line graph in FIG. 1), which is then displayed on dashboard 110. Visualization 112 represents analysis performed on data retrieved from multiple data sources 102-1, 102-2, 102-3, and 102-4.

In certain embodiments, the user can specify analysis information 114 or criteria describing the analysis to be performed and how the analysis results are to be displayed in a visualization. Data analysis system 100 then performs the analysis indicated by the user on the result set 108 obtained from executing combined query 106. In some embodiments, as part of performing the analysis, data analysis system 100 uses the analysis information 114 provided by the user to generate a modified combined query (or modified query) 116 based upon combined query 106. Modified combined query 116 is based upon the base or original combined query (base query or original query) 106 and additionally includes information related to the analysis to be performed as specified by the user. Modified combined query 116 may then be executed to generate an analysis result set that is then used to generate visualization 112.

The same result set obtained from executing base combined query 106 may be used for performing multiple analyses. As described above, one such analysis may include generating a single line graph visualization. Other analyses may also be performed on the result set. In certain embodiments, data analysis system 100 generates a modified combined query corresponding to each analysis to be performed. Each such modified combined query is based upon the same base combined query 106 and additionally includes information related to a particular analysis to be performed as specified by the user. In this manner, a base combined query 106 can form the basis for multiple different modified combined queries, each modified combined query configured to perform a specific analysis specified by the user.

The high-level concept described above with respect to FIG. 1 can be illustrated using the following examples.

Example #1: Sales Region example
Example #2: Compensation example

These examples are not intended to be restrictive or limiting.

Example #1: Sales Region Example

In this example, it is assumed that a user wants to determine monthly sales data for multiple geographic regions and then display a visualization (e.g., a line graph) to display the analysis results. For purposes of this example, it is assumed that the sales dates is stored in two separate data sources, one data source storing data for the Western Region and another storing data for the Eastern Region. For example, the sales data for the Western Region may be stored in a first data source ("SALES_WESTERN_REGION", which may be a data object such as a table or view) and the Western Region may include two regions, namely, Los Angeles (LA) and San Francisco (SF). An example of data stored in the first data source is shown in Table A below.

TABLE A

| SALES_WESTERN_REGION ("BEAM_VIEW_48") | | |
|---|---|---|
| SALES_DATE | LA | SF |
| Jan. 12, 2015 | 250 | 120 |
| Jan. 18, 2015 | 200 | 140 |
| Feb. 1, 2015 | 190 | 180 |
| Mar. 15, 2015 | 195 | 185 |

The sales data for the Eastern Region may be stored in a second data source ("SALES_EASTERN_REGION", which may be a data object such as a table or view) which is separate and different from the first data source. The Eastern Region may include two regions, namely, Washington D.C. (DC) and New York (N.Y.). An example of data stored in the second data source is shown in Table B below.

TABLE B

| SALES_EASTERN_REGION ("BEAM_VIEW_50") | | |
|---|---|---|
| SALES_DATE | NY | DC |
| Jan. 1, 2015 | 1000 | 510 |
| Jan. 18, 2015 | 1110 | 450 |
| Feb. 19, 2015 | 1050 | 320 |
| Mar. 30, 2015 | 1025 | 300 |

The views shown in Tables A and B can be based upon tables from the same database or from different databases. For example, the view BEAM_VIEW_48 depicted in Table A could be a join between multiple database tables with one or more filters pre-applied that gleans sales data in the Western Region. In a similar manner, the view BEAM_VIEW_50 depicted in Table B could be a join between multiple database tables with filters pre-applied. For example, the view BEAM_VIEW_50 depicted in Table B could be a join between multiple database tables with one or more filters pre-applied that gleans sales data in the Eastern Region. Each view itself is a table comprising rows and columns. A user may select these two data sources for the analysis.

A single source query may then be provided for selected data source. For example, a single source query may be provided for SALES_WESTERN_REGION ("BEAM_VIEW_48") data source and another single source query may be provided for the SALES_EASTERN_REGION ("BEAM_VIEW_50") data source. In certain embodiments, data analysis system 100 may provide a GUI that enables the user to select particular data source and configure a single source query for the selected data source. FIG. 2 illustrates an exemplary GUI 200 that may be provided by a data analysis system according to certain embodiments. GUI 200 enables a user to select a data source and provide inputs that are used by the data analysis system to generate a single source query for the selected data source. In certain embodiments, GUI 200 may be displayed on a device or system used by the user, for example, GUI 200 may be displayed on a computing platform used by the user.

As shown in FIG. 2, GUI 200 provides a user-selectable control 202 (a drop-down menu in FIG. 2) that enables a user to select a data source of interest to the user. For example, as depicted in FIG. 2, the user has selected the SALES_EASTERN_REGION data source (which is illustrated above in Table B). Once the data source has been selected, data analysis system 100 may then retrieve metadata for the selected data source. The retrieved metadata may include multiple metadata attributes associated with the selected data source. For example, if the selected data source is a table or view, the metadata attributes for the data source may include attributes related to information identifying the various columns of the table or view, the names of the columns, the data type associated with each column, and the like. One or more of the metadata attributes 204 (e.g., column names) may then be displayed on GUI 200. In the example depicted in FIG. 2, the displayed metadata include information identifying the columns "SALES_DATE", "NY" and "DC" of data source SALES_EASTERN_REGION (BEAM_VIEW_50).

There are various different ways in which data analysis system 100 may determine the metadata for a data source. In certain embodiments, upon receiving information identifying a data source, data analysis system 100 is configured to query the data source for metadata information. For example, in one embodiment, if the data source is a table or a view, data analysis system 100 may query the data source using a SQL query such as "SELECT * from <Data_Source>". Execution of this query may result in data analysis system 100 receiving data from the data source and also metadata information for the data source. The metadata attributes information may then be displayed on GUI 200.

The metadata attributes associated with a data source may depend upon the type of the data source. For example, for a table or view data source, the associated metadata attributes may include information such as the name of the table or view, number of columns in the table or view, names of the columns, label associated with the columns, and the like. The metadata associated with a column may, for example, include without limitation, various metadata attributes such as a column type, a column name, a column label (the text printed for the column), and other metadata associated with the column. For example, for the SALES_EASTERN_REGION ("BEAM_VIEW_50") data source example depicted in Table B, the associated metadata attributes information may include:

For 1$^{st}$ column:
Column name: Date of Sale
Column label: SALES_DATE
Column type: Date
For 2nd column:
Column name: Sales data for NY
Column label: NY
Column type: Integer
For 3$^{rd}$ column:
Column name: Sales Data For DC
Column label: DC
Column type: Integer Data analysis system 100 may then display the column labels metadata 204, as shown in FIG. 2.

As shown in FIG. 2, GUI 200 provides check boxes 206 that enable the user to select which fields or columns are of interest to the user for the analysis to be performed. In the example depicted in FIG. 2, the user has selected the "SALES_DATE", "NY" and "DC" columns. The inputs provided by the user (e.g., the selected data source, columns of interest to the user) are then used by data analysis system 100 to generate a single source query for the data source.

In certain embodiments, for certain data sources, the single source queries are in the form of SQL queries. SQL is however just one of various different languages that can be used for generating the combined queries, including base combined queries or modified combined queries. The combined queries, including a base combined query or a modified combined query, can be in various different programming and data querying and manipulation languages. An exemplary SQL query is typically formed of three clauses: SELECT, FROM, and WHERE, and has the following form:
SELECT <attribute list>
FROM <data source>
WHERE <condition>
where:
<attribute list> is a list of attribute names (e.g., column names) whose values are to be extracted by the query;
<data source> identifies a relation name or data source from which data is to be extracted; and
<condition> is a conditional (Boolean) expression that identifies conditions or filters related to the rows or records of the data source (e.g. a table or view) to be retrieved by the query.

In the example depicted in FIG. 2, the data source selected by the user using control 202 is used as an input parameter to the FROM clause, and the columns selected by the user using checkboxes 206 are used as input parameters to the SELECT clause. A GUI 200 also provides a filter control 208 that may be used by the user to define filters to be applied to the data source. Inputs provided by the user using filter control 208 may then be provided as input parameters to the WHERE clause of the SQL query.

Based upon the user selections in GUI 200, in certain embodiments, a single source query is automatically generated by data analysis system 100 for the selected data source SALES_EASTERN_REGION (BEAM_VIEW_50). In one embodiment, the following single source query is automatically generated by data analysis system 100 based upon the user selections depicted in FIG. 2.

Single Source Query for SALES_EASTERN_REGION:
SELECT SALES_DATE, NY, DC FROM BEAM_VIEW_50 WHERE ROWNUM<=10240

In the example depicted in FIG. 2, the single source query that is generated based upon user selections in GUI 200 is displayed in area 210 on GUI 200.

In the manner described above, data analysis system 100 automatically generates a single source query for the data source based upon inputs provided by the user. GUI 200 enables even a non-technical business user to provide the necessary inputs to identify the data source and data of interest (e.g., specific columns within the data source) and data analysis system 100 automatically generates the actual single source query.

In a similar manner, a single source query may also be configured for SALES_WESTERN_REGION ("BEAM_VIEW_48"). In one embodiment, the following single source query may be automatically generated by data analysis system 100 for SALES_WESTERN_REGION ("BEAM_VIEW_48").

Single Source Query for SALES_WESTERN_REGION:
SELECT SALES_DATE, LA, SF FROM BEAM_VIEW_48 WHERE ROWNUM<=10240

A base combined query may then be automatically generated by data analysis system 100 based upon the single source queries. The base combined query is such that the result of executing the base combined query is equivalent to the combination of the results of executing the multiple single source queries that are used for generating the base combined query. In one embodiment, a base combined query generated based upon the single source queries shown above for the SALES_EASTERN_REGION and the SALES_WESTERN_REGION may be as follows.

```
Base Combined Query:
Select SALES_DATE, LA, SF, NY, DC from (
    Select SALES_DATE, LA, SF, 0 as NY, 0 as DC from
        (SELECT SALES_DATE AS SALES_DATE, LA AS LA, SF
            AS SF FROM BEAM_VIEW_48)
UNION ALL
    Select SALES_DATE, 0 as LA, 0 as SF, NY, DC from
        (SELECT SALES_DATE AS SALES_DATE, NY AS NY, DC
            AS DC FROM BEAM_VIEW_50)
)
```

In the example above, the single source queries have been combined in the base combined query using the "UNION ALL" clause.

Additionally, as part of generating the combined query, data analysis system 100 determines how the metadata attributes (e.g., columns and column names) from one single source query maps to the metadata attributes of the other single source queries being combined in the base combined query. This processing may be referred to as normalizing the single source queries or finding commonalities between the base combined queries. For example, for the two region-related single source queries identified above, data analysis system 100 may determine that the first single source query comprises columns SALES_DATE, SF, and LA, and that the second single source query comprises columns SALES_DATE, NY, and DC. Data analysis system 100 may further determine that the SALES_DATE columns in the two queries map to each other. In one embodiment, the mapping information regarding the columns in two separate single source queries may be provided by the user. For example, data analysis system 100 may display the columns for the multiple single source queries to be combined in the combined query and the user may then indicate mappings identifying commonalities between columns of different single source queries. This mapping information is then included in the base combined query that is generated by data analysis system 100. In the example embodiment shown above, this is done by using aliases. For example, in the combined query shown above, the "AS" clause has been used (e.g., SALES_DATE AS SALES_DATE, LA AS LA, SF AS SF, NY AS NY, DC AS DC). The "SALES_DATE" columns in the two single source queries are aliased to the same "SALES_DATE" column for the result set obtained from executing the base combined query.

Data analysis system 100 may then execute the generated combined query. Execution of the combined query results in a result set being returned. Execution of the combined query also enables data analysis system 100 to retrieve the metadata attributes associated with the result set. The metadata attributes for the result set may include attributes such as the number of columns in the result set, the names of the columns, the datatypes associated with the columns, and the like. For example, for the result set obtained from executing the combined query shown above, the metadata attributes may include attributes that indicate that the result set has five columns and the column are SALES_DATE, NY, DC, LA, and SF. In certain embodiments, Java DataBase Connectivity (JDBC) APIs may be used to execute the combined query. JDBC APIs are typically used to access any kind of tabular data, especially data stored in a relational database. JDBC APIs may also be used to introspect and determine the metadata attributes (e.g., columns, column names, column labels, etc.) associated with the result set. As described below, in certain embodiments, data analysis system 100 may expose the metadata attributes associated with the result set to the user to enable the user to specify the analysis to be performed on the result set based upon the metadata attributes. Various other techniques may also be used to determine the columns-related metadata for the combined query. For example, in certain embodiments, the combined query may be parsed to determine the columns, their names, their associated datatypes, and the like.

Data analysis system 100 may then execute the base combined query. The result set obtained from executing the base combined query may be stored as a memory object such as object 108 depicted in FIG. 1. The memory object may be stored in the system memory (e.g., RAM) of the data analysis system. Data analysis system 100 also determines metadata attributes (e.g., column names, column labels) associated with the result set.

Data analysis system 100 enables the user to perform different types of analyses on the result set obtained from executing the base combined query. The analyses may include, for example, slicing-and-dicing the data in the result set along various dimensions or measures, generating one or more visualizations, associating triggers with the data in the result set (e.g., a trigger may be programmed to execute when certain conditions are met by the result-set), performing actions when certain conditions in the result set data are satisfied, and the like. For example, in FIG. 1, visualization 112 is generated based upon the result set data and displayed to the user. Visualization 112 may depict multiple time series data, each of which may be based on data retrieved from different data sources, such as the data sources 102-1, 102-2, 102-3, 102-4, etc., as a result of executing the base combined query. For example, without limitation, the data series in data graph 112 may include sales data by month for the LA market, the SF market, the NY market, and for the DC market. The visualization thus provides a visual representation of analysis performed across the data extracted from the multiple data sources. Various different kinds of visualizations may be used for representing the analysis performed on the result set, such as various types of graphs, bar charts, pie charts, histograms, scatter plots, distribution diagrams, and the like.

In certain embodiments, information regarding the analysis to be performed on the result set may be provided by the user. For example, as shown in FIG. 1, the user may provide analysis information 114 indicating the analysis that the user wants to perform on the result set. In certain embodiments, data analysis system 100 may provide an interface that enables the user to provide the analysis information in a simplified and flexible manner. For example, data analysis system 100 may provide a GUI that enables a user to select or define the analysis to be performed on the result set obtained from executing the base combined query. The user may also use the GUI to indicate the type of visualization (e.g., line graph, pie chart) to be used for displaying the analysis results.

In certain embodiments, in order to help the user indicate the analysis (or analyses) to be performed, data analysis system 100 may, via a GUI, display information related to the result set, such as metadata information, to the user. The user may then use the displayed information (e.g., metadata information) to indicate the analysis that the user wants to perform on the result set. In this manner, even a non-technical business user can provide information related to the analysis to be performed.

Figure 3A:
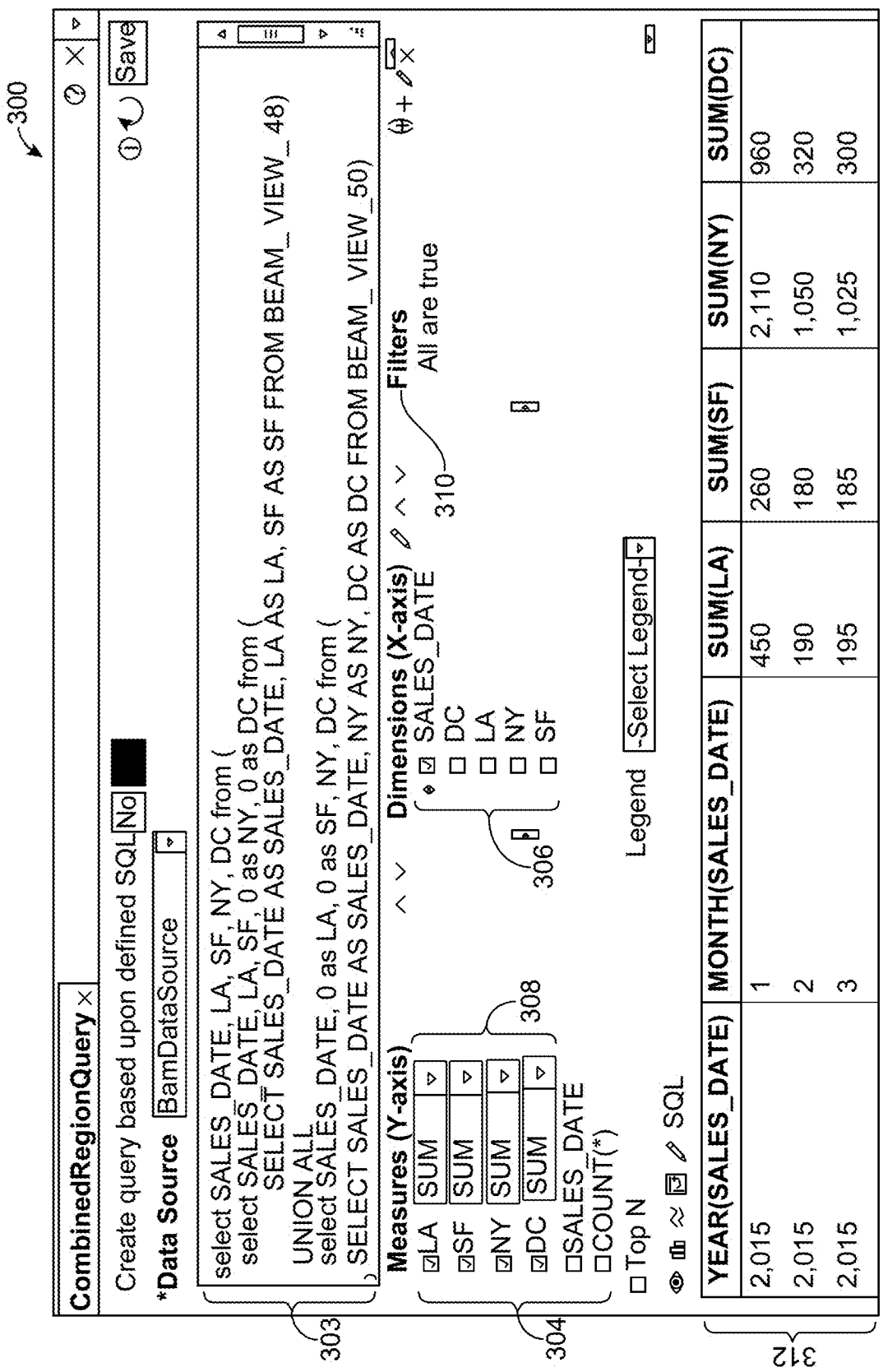
FIGS. 3A and 3B illustrate exemplary user interfaces provided by a data analysis system that enables a user to specify analysis information according to certain embodiments.

FIG. 3A illustrates a simplified exemplary user interface 300 provided by a data analysis system that enables a user to specify analysis information according to certain embodiments. GUI 300 may be displayed on a computing platform used by the user. The analysis information provided by the user via GUI 300 may then be used by data analysis system 100 to create a modified combined query that is based upon the base combined query but additionally comprises information reflecting the analysis to be performed. The base combined query that generated the result set is displayed in 303.

In the example depicted in FIG. 3A, the base combined query that generated the result set is displayed in area 303 of GUI 300. To enable the user to describe the analysis to be performed, GUI 300 displays various metadata attributes related to the result set. The user can then describe the analysis to be performed by selecting one or more of these displayed metadata attributes. For example, in FIG. 3A, the displayed metadata attributes include column names (or column labels) of the result set are displayed for selection along multiple axes (X-axis and Y-axis in FIG. 3A). In FIG. 3A, column labels LA, SF, NY, DC, and SALES_DATE are displayed for selection as measures for the Y-axis and as dimensions for the X-axis.

For each axis, user-selectable controls (e.g., check boxes in FIG. 3) are provided that enable the user to select specific columns as dimensions and measures. In this example, the user wants to determine the aggregate sales per region per month. As a result, in FIG. 3, the user has selected the columns LA, SF, NY, and DC as measures for the Y-axis and column SALES_DATE as a measure for the X-axis.

GUI 300 also enables the user to specify functions to be performed as part of the analysis. For example, as depicted in FIG. 3A, GUI 300 displays user-selectable controls 308 (e.g., pulldown menus) that enable selection of functions to be performed on the columns of the result set. For example, in FIG. 3A, a user can select an aggregation operator to be applied to the individual measures. In FIG. 3A, since the user wants to determine aggregate sales per region per month, the user has selected the SUM aggregate operator for each of the selected Y-axis measures. The SUM operator (which returns the sum of numeric fields) causes the sales data for each selected column measure (LA, SF, NY, and DC in FIG. 3A) to be summed on a per month basis. In addition to the SUM operator, various other operators or functions may be provided for user selection, such as, without limitation:

COUNT—For a field of any type, this function returns a count of the values, including duplicates.

COUNT DISTINCT—For a field of any type, this function returns a count of the unique values, not including duplicates.

MINIMUM or MIN—For a field of any type, this function returns the earliest, lowest, or alphanumeric first value in the group.

MAXIMUM or MAX—For a field of any type, this function returns the latest, highest, or alphanumeric last value in the group.

AVERAGE or AVG—For a numeric field, this function returns the statistical average.

MEDIAN—For a numeric field, this function returns the statistical median. For a datetime field, it returns the middle chronological value. For a string field, it returns the middle alphanumeric value.

STD DEV—For a numeric field, this function returns the statistical standard deviation.

VARIANCE—For a numeric field grouped by a dimension, this function returns the statistical variance accounted for by a particular group.

PERCENT OF TOTAL—For a numeric field grouped by a dimension, this function returns the group sum percentage of the sum of all groups.

GUI 300 also provides a filter control 310 that enables the user to add one or more filters for the analysis.

In certain embodiments, the user may also select and specify the time duration to be used for the time series data to be generated from the analysis. For example, upon selecting SALES_DATE as a dimension for the X-axis, data analysis system 100 may cause a second GUI 350 depicted in FIG. 3B to be displayed to the user. In GUI 350, the user can select that a time series is to be generated and that set the time unit for the analysis (a month in the example depicted in FIG. 3B) and set the quantity for the time series (in FIG. 3B, a quantity of "1" is selected indicating that the data is to be determined for a per-month basis).

After the user has completed specifying all the criteria for the analysis to be performed, data analysis system 100 is configured to generate a modified combined query based upon the user inputs and then execute the modified combined query to perform the analysis. In some embodiments, data analysis system 100 uses the analysis information input by a user to generate a modified combined query (e.g., modified combined query 116 in FIG. 1). The modified combined query is based upon the base combined query whose execution resulted in the result set and additionally includes information related to the analysis to be performed, as specified by the user.

Figure 3B:
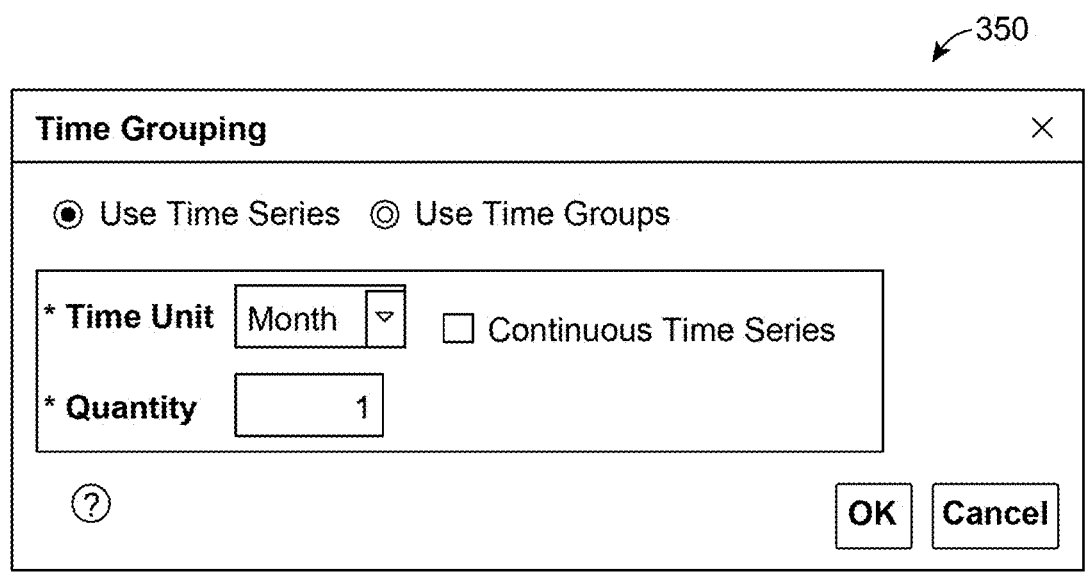

FIG. 4 depicts an example of a modified combined query 400 that may be generated by a data analysis system in certain embodiments based upon the data shown in Tables A and B, based upon the base combined query shown above for the Sales Region example, and based upon the user inputs provided by the user in FIGS. 3A and 3B. Modified combined query 400 depicted in FIG. 4 is meant only as an example and is not intended to be restrictive or limiting. The contents of modified combined query 400 may be different in different embodiments.

As shown in the example in FIG. 4, modified combined query 400 includes the base combined query that generated the result set on which the analysis is to be performed. Additionally, modified combined query 400 comprises sections 402 and 404 that represent code (SQL code in this example) corresponding to the analysis information provided by the user describing the analysis to be performed on the result set obtained by executing the base combined query. In FIG. 4, the analysis to be performed is to determine aggregate monthly sales data for multiple geographic regions.

Data analysis system 100 may then execute the modified combined query (such as modified combined query 400 depicted in FIG. 4). Execution of the modified combined query results in an analysis result set being obtained or generated, where the analysis result set reflects the results of the analysis specified by the user. For example, in the Sales Region example, execution of modified combined query 400 generates an analysis result set that shows the aggregate monthly sales data for multiple geographic regions.

As an example, execution of modified combined query 400 generates the following analysis result set depicted in Table C below. This example assumes that the base combined query executes on data sources shown in Table A and B, above. The analysis result set comprises analysis results obtained from performing analysis on data extracted from multiple data sources.

TABLE C

Analysis Result Set
(from executing combined query 400 depicted in FIG. 4)

| YEAR | MONTH | LA  | SF  | NY   | DC  |
|------|-------|-----|-----|------|-----|
| 2015 | 1     | 450 | 260 | 2110 | 960 |
| 2015 | 2     | 190 | 180 | 1050 | 320 |
| 2015 | 3     | 195 | 185 | 2025 | 300 |

Referring back to the example depicted in FIG. 3A, the analysis result set may be displayed to the user in area 312 of GUI 300. This enables the user to see the analysis result set generated by the user inputs. The user may then modify the analysis information (e.g., make change to the user selections made in GUIs 300 and 350) based upon the displayed analysis result set. In this manner, the user can interactively and dynamically change the analysis to be performed and see the results of the analysis.

There are various ways in which the analysis result set data may be output to the uses. The analysis result set data may be output to the user as a table, text, a visualization, and the like. If a visualization is to be generated, in certain embodiments, the analysis result set may be provided to a visualization generator that then generates the desired visualization (e.g., a line graph) based upon the analysis result set. The visualization may then be output to the user. Various different types of visualizations, such as without limitation a line graph, a bar chart, etc., may be used to display the analysis result set. The type of visualization to be used may be provided by the user.

Figure 11:
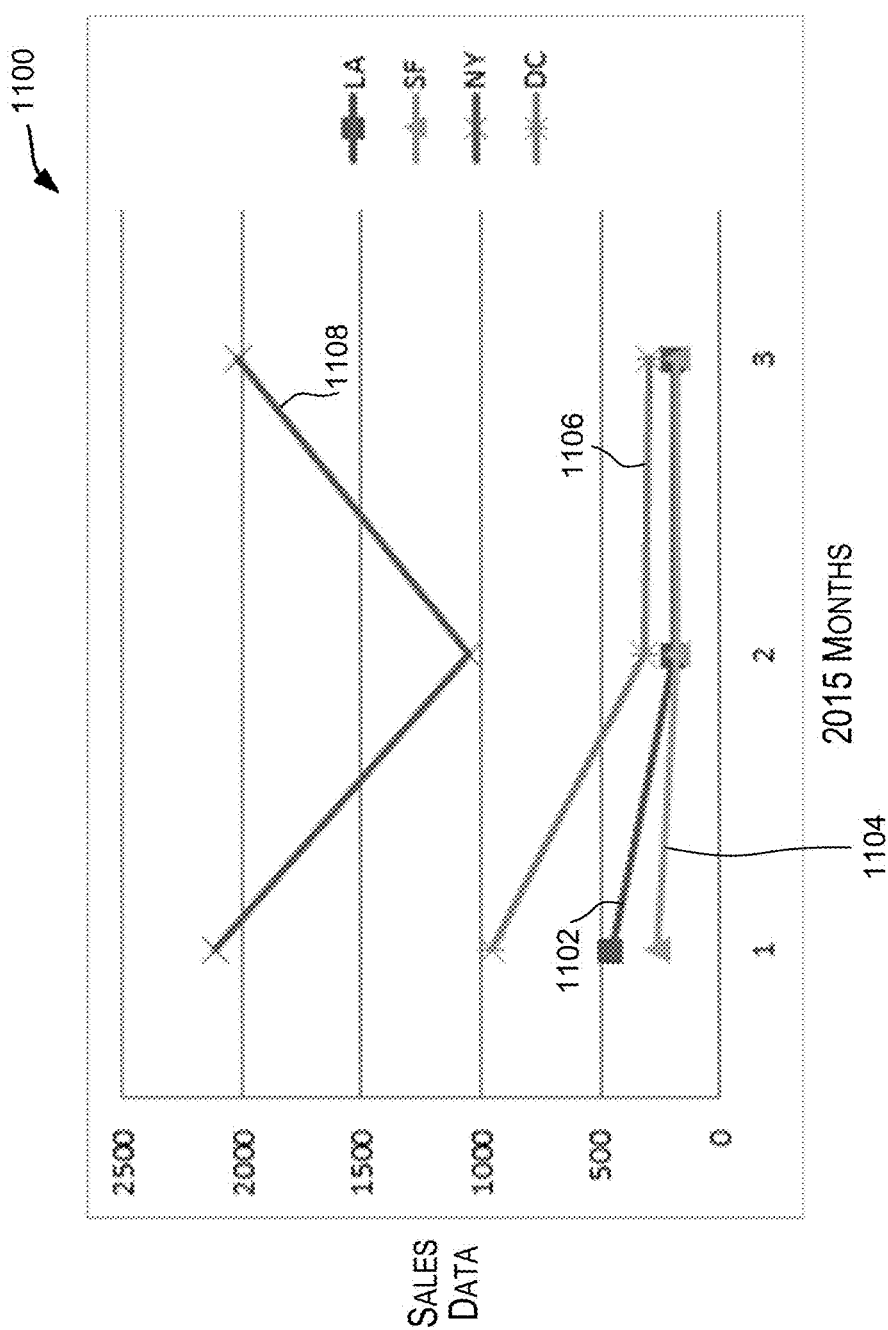
FIG. 11 illustrates an exemplary line graph that is generated by a data analysis system based upon an analysis result set according to certain embodiments.

The analysis result data in Table C can then be provided to a visualization generator to generate a single line graph desired by the user. The single line graph represents analysis performed on data from multiple data sources. An example of such a line graph corresponding to the analysis result depicted in Table C is depicted in FIG. 11. FIG. 11 illustrates an exemplary line graph 1100 that is generated by a data analysis system based upon the analysis result set shown in Table C. As depicted in FIG. 11, graph 1100 shows four lines 1102, 1104, 1106, and 1108 (four time data series) showing monthly sales data for regions LA, SF, DC, and NY, respectively. The Y-axis represents the aggregate sales data and the X-axis shows monthly information. The visualization represents a visual representation of analysis performed on data from different data sources using a combined query and a modified combined query. For example, line graph 1100 may be displayed on a dashboard interface.

<End of Example #1>

Example #2: Compensation Example

For purposes of this example, it is assumed that an enterprise has multiple internal departments, where each department has a different way to compute an employee's overall compensation. For example, each department may have department-specific rules/regulations to compute compensation for employees belonging to that department. In this environment, a user (e.g., a C-level executive) may want to determine the top ten compensated employees across the enterprise.

For purposes of this example, it is assumed that the enterprise has four different departments: a Mobile Division, a Cloud Division, a Sales Division, and a Contractors Division. Each department may store employee compensation data differently (e.g., using different table implementations) and use different ways to calculate employee compensation. For example, the Mobile Division may store the data in a Table MOBILE_EMP having columns:
 NAME—Storing name of employee
 EMPLOYEE_ID—Storing employee ID for the employee
 SALARY—Storing a salary for the employee.
The Cloud Division may store the data in a Table CLOUD_EMP having columns:
 NAME—Storing name of employee
 EMPLOYEE_ID—Storing employee ID for the employee
 SALARY—Storing a salary for the employee.
The Sales Division may store the data for its employees in a Table SALES_EMPLOYEES that uses different column names for the same data. Table SALES_EMPLOYEES may have the following columns:
 FULLNAME—Full name of the employee
 EMP_ID—Employee ID for the employee
 SALARY—Salary for the employee
 BONUS_Q1—Quarter 1 bonus for the employee
 BONUS_Q2—Quarter 2 bonus for the employee
Additionally, for the Sales Division, the compensation for an employee may be calculated based upon a salary and also include bonuses (which is different from the salary-only based compensation for the Mobile and Cloud divisions).
The Contractors Division may store the data in a Table CONTRACTOR_1099 having columns:
 NAME—Name of the contractor
 CONTRACTOR_ID—Contractor ID
 TOTAL—Total compensation for the contractor As indicated above, a user may want to determine the top ten compensations across all four departments. The four tables identified above represent four different data sources. The user may identify the data sources involved in the analysis and provide single source queries for each the data sources. These single source queries may be configured via a GUI such as GUI 200 depicted in FIG. 2. Alternatively, the user may manually create and provide one or more of the single source queries. As an example, the following single source queries may be provided or automatically configured by a data analysis system:
Single source query for Table MOBILE_EMP corresponding to the Mobile Division:
 (SELECT NAME,
 NAME||', Employee #' ||EMPLOYEE_ID,
 SALARY
 FROM MOBILE_EMP)
Single source query for Table CLOUD_EMP corresponding to the Cloud Division:
 (SELECT NAME,
 NAME||', Employee #'||EMPLOYEE_ID,
 SALARY
 FROM CLOUD_EMP)
Single source query for Table SALES_EMP corresponding to the Sales Division:
 (SELECT FULLNAME,
 FULLNAME||', Employee #' ||EMP_ID,
 SALARY+BONUS_Q1+BONUS_Q2
 FROM SALES_EMPLOYEES)

Single source query for Table SALES_EMP corresponding to the Sales Division:
(SELECT NAME,
NAME∥', Contractor #'∥CONTRACTOR_ID,
TOTAL
FROM CONTRACTOR_1099)

The data analysis system may then form a base combined query based upon the four single source queries identified above. As part of generating the base combined query, the data analysis system may validate each single source query by executing the single source query and getting metadata information for the corresponding data source.

Further, as part of creating the combined query, the data analysis system may perform normalization processing to determine the common metadata attributes across the data sources. For example, the data analysis system may determine that SALARY from the MOBILE_EMP table, SALARY from the CLOUD_EMP table, (SALARY+BONUS_Q1+BONUS_Q2) from the SALES_EMPLOYEES table, and TOTAL from the CONTRACTOR_1099 table are equivalent to each other. Likewise, the data analysis system may determine that NAME from the MOBILE_EMP table, NAME from the CLOUD_EMP table, FULLNAME from the SALES_EMPLOYEES table, and NAME from the CONTRACTOR_1099 table map to and are equivalent to each other. The data analysis system may further determine that (NAME∥', Employee #'∥EMPLOYEE_ID) from the MOBILE_EMP table, (NAME∥', Employee #' ∥EMPLOYEE_ID) from the CLOUD_EMP table, (FULLNAME∥', Employee #'∥EMP_ID) from the SALES_EMPLOYEES table, and (NAME∥', Contractor #'∥CONTRACTOR_ID) from the CONTRACTOR_1099 table map to and are equivalent.

The data analysis system may use different techniques to determine equivalency or commonality between the metadata attributes of the data sources. In certain embodiments, this information may be provided by the user. For example, in one embodiment, the data analysis system may display the columns of the multiple data sources to the user. The user may then indicate which columns are equivalent. For example, in the Sales Region example above, the user may indicate that SALARY from the MOBILE_EMP table, SALARY from the CLOUD_EMP table, (SALARY+BONUS_Q1+BONUS_Q2) from the SALES_EMPLOYEES table, and TOTAL from the CONTRACTOR_1099 table are equivalent to each other. This equivalency information and the mapping provided by the user is then used by the data analysis system to generate a base combined query that reflects the equivalency and mapping information. For example, in certain embodiments, data analysis system may use aliases (e.g., using the "AS" clause in SQL) to show the equivalencies. Other techniques may also be used.

FIG. 5 depicts an exemplary base combined query 500 generated by the data analysis system based upon the single source queries provided above for the four division tables according to certain embodiments. Base combined query 500 is only an example and not intended to be restrictive or limiting. In alternative embodiments, the contents of a base combined query may be different. As shown in FIG. 5, in base combined query:

(a) SALARY from the MOBILE_EMP table, SALARY from the CLOUD_EMP table, (SALARY+BONUS_Q1+BONUS_Q2) from the SALES_EMPLOYEES table, and TOTAL from the CONTRACTOR_1099 are aliased to COMPENSATION;

(b) NAME from the MOBILE_EMP table, NAME from the CLOUD_EMP table, FULLNAME from the SALES_EMPLOYEES table, and NAME from the CONTRACTOR_1099 table are aliased to NAME; and (c) (NAME∥', Employee #'∥EMPLOYEE_ID) from the MOBILE_EMP table, (NAME∥', Employee #'∥EMPLOYEE_ID) from the CLOUD_EMP table, (FULLNAME∥', Employee #'∥ EMP_ID) from the SALES_EMPLOYEES table, and (NAME∥', Contractor #'∥CONTRACTOR_ID) from the CONTRACTOR_1099 table are aliased to DISPLAY_NAME.

Base combined query 500 may then be executed by the data analysis system to get a result set from the four different tables and to get the metadata attributes (e.g., column list, column names, column labels) for the result set. In this case, the column list includes columns NAME, DISPLAY_NAME, and COMPENSATION. These column names may then be displayed to the user to enable the user to configure and provide analysis information. As part of providing information related to the analysis to be performed, the user may then select one or more column names of interest to the user for his or her analysis. For example, the user may only select columns DISPLAY_NAME and COMPENSATION. The user may also associate operators and functions with the selected metadata attributes to specify that the analysis is to determine the top ten compensations.

Based upon the user-provided analysis information, the data analysis system may then generate a modified combined query based upon the base combined query and additionally comprising information related to the analysis to be performed. In certain embodiments, the data analysis system takes the base combined query and creates a wrapper around it, where the wrapper includes code (e.g., SQL code) related to the analysis to be performed on the results set obtained from executing the base combined query. FIG. 6 shows an example of a modified combined query 600 generated by a data analysis system based upon the base combined query depicted in FIG. 5. As shown, modified combined query 600 includes portion 602 that corresponds to the base query from FIG. 5. The other portions of modified combined query 600 correspond to implementation of analysis to be performed as specified by the user (in this example, to determine the top ten compensations).

The data analysis system may then execute modified combined query 600 to generate an analysis result set. The analysis result set includes data that reflects the user-specified analysis (e.g., the top ten compensations). The analysis result set data may then be output to the user. If a visualization is to be displayed, the analysis result set may be provided to a visualization generator that is configured to create a visualization such as a chart for the analysis result set data. The visualization may then be output to the user via an output device, such as a display of the user's device.

<End of Example #2>

Figure 7:
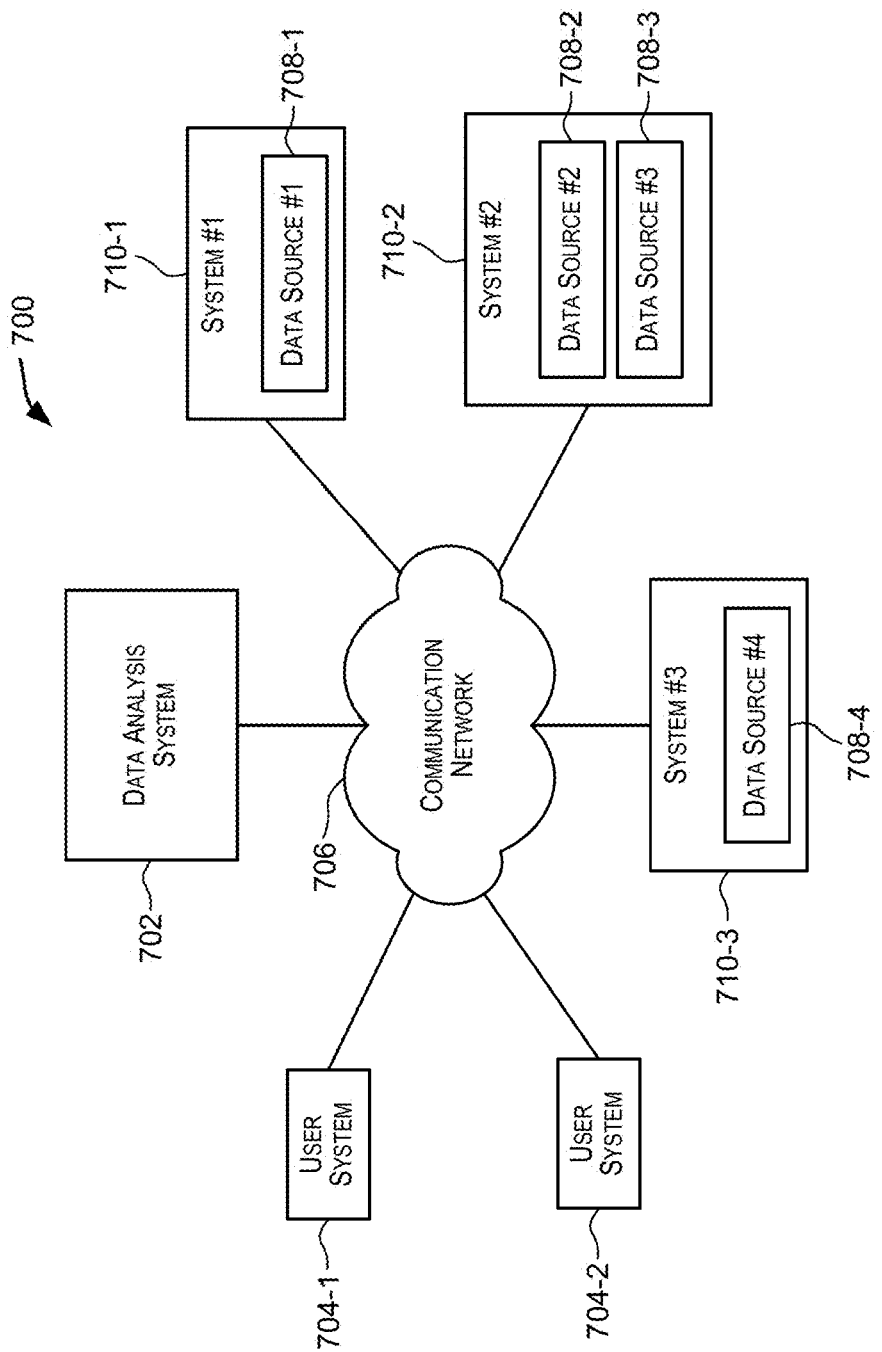
FIG. 7 is a simplified block diagram of a distributed environment that may incorporate an embodiment of a data analysis system.

FIG. 7 is a simplified block diagram of a distributed environment 700 that may incorporate an embodiment of a data analysis system. Distributed environment 700 may comprise multiple systems communicatively coupled to each other via one or more communication networks 706. The systems in FIG. 7 include a system 702 that performs the functions of a data analysis system, one or more user systems 704-1, 704-2, and one or more systems storing one or more data sources. For example, in the embodiment depicted in FIG. 7, a first system 710-1 stores a first data source 708-1, a second system 710-2 stores a second data source 708-2 and a third data source 708-3, and a third system 710-3 stores a fourth data source 708-4. Although not shown in FIG. 7, a data source may also be local to data analysis system 702 or to a user system. Distributed environment 700 depicted in FIG. 7 is merely an example and is not intended to unduly limit the scope of inventive embodiments recited in the claims. One of ordinary skill in the art would recognize many possible variations, alternatives, and modifications. For example, in some implementations, distributed environment 700 may have more or fewer systems than those shown in FIG. 7, may combine two or more systems, or may have a different configuration or arrangement of systems.

Communication network 706 facilitates communications between the various systems depicted in FIG. 7. Communication network 706 can be of various types and can include one or more communication networks. Examples of communication network 706 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 708 may include any infrastructure that facilitates communications between the various systems depicted in FIG. 7.

A user may use a user system (e.g., 704-1) to interact with data analysis system 702 and request analysis of data that may be spread across multiple data sources in distributed environment 700. For example, a user may use a user system to connect to data analysis system 702. After connecting to data analysis system 702, the user may identify multiple data sources storing data of interest to the user for performing analysis. In one embodiment, upon connecting to data analysis system 702, GUIs provided by data analysis system 702 may be output on the user's system. The user may then use the one or more GUIs provided by data analysis system 702 to identify the data sources of interest to the user. The user may also provide single source query information for each of the selected data sources. Data analysis system 702 may then generate a base combined query based upon the multiple single source queries. Data analysis system 702 may then execute the base combined query and obtain a result. The user may then, using the user system, provide analysis information to data analysis system 702 identifying the analysis to be performed on the result set. Data analysis system 702 may then generate a modified combined query based upon the base combined query and the user-provided analysis information. The modified combined query may include the base combined query and also programming/code for performing the user-specified analysis. Data analysis system 702 may then execute the modified combined query and obtain an analysis result set that represents the results of the user-specified analysis. The analysis result set may then be output to the user. In one embodiment, the analysis result set may be output to the user as a visualization (e.g., a line graph) that is displayed by the user's system.

Various different analyses may be performed by the user based upon the result set obtained from executing the base combined query. In certain embodiments, a modified query may be generated for each such analysis. Each modified query may include the base combined query and may additionally include information regarding the analysis to be performed on the result set obtained from executing the base combined query. In this manner, the same base combined query may form the basis for multiple modified combined queries corresponding to the multiple analyses to be performed.

Figure 8:
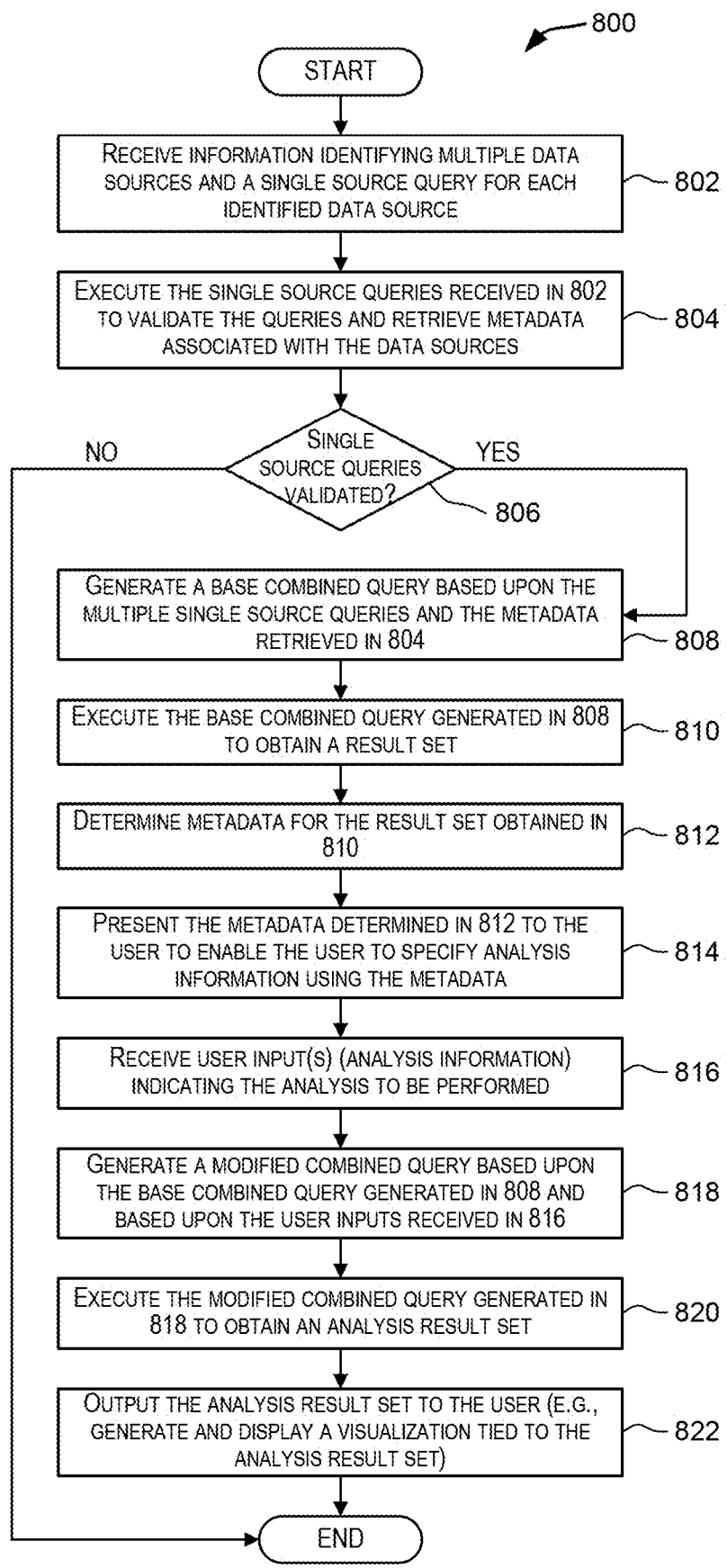
FIG. 8 depicts a simplified flowchart depicting processing performed by a data analysis system according to certain embodiments.

FIG. 8 depicts a simplified flowchart 800 depicting processing performed by a data analysis system according to certain embodiments. The processing depicted in FIG. 8 may be implemented in software (e.g., code, instructions, program) executed by one or more processing units (e.g., processors, cores) of a data analysis system, hardware, or combinations thereof. The software may be stored on a non-transitory storage medium (e.g., on a memory device). The method presented in FIG. 8 and described below is intended to be illustrative and non-limiting. The particular series of processing steps depicted in FIG. 8 is not intended to be limiting. It is appreciated that the processing steps may be performed in an order different from that depicted in FIG. 8, and that not all the steps depicted in FIG. 8 need be performed.

At 802, a data analysis system receives information identifying multiple data sources and a single source query for each identified data source. One or more of the single source queries may be manually configured by a user and provided to the data analysis system. Alternatively, one or more of the single source queries may be automatically generated by the data analysis system based upon inputs provided by the user. For example, as described above with respect to FIG. 2, a user may select a particular data source and the data analysis system may automatically determine the data in the data source and its associated metadata (e.g., columns in a table of view). The user may then select the columns of interest to the user and the data analysis system may then automatically generate a single source query for the data source based upon the user-provided inputs. Multiple single source queries may be configured in a similar manner.

At 804, the data analysis system executes each of the single source queries received in 802. The data analysis system may execute a single source query by triggering a remote call into the data source implicated by the single source query and executing the single source query. Execution of the single source queries may serve multiple purposes. Execution of a single source query enables the data analysis system to validate the single source query. Validation of a single source query may include determining whether the syntax of the single source query is correct. Validation may also include determining whether the data analysis system can connect to the data source and extract data from the data source using the single source query for that data source. Execution of a single source query also enables the data analysis system to retrieve metadata attributes (e.g., table name, number of columns, column names, column labels, etc.) for the data source corresponding to the single source query. In certain embodiments, data analysis system 702 may use a JDBC APIs to execute the single source query and retrieve the associated metadata attributes. For example, the data analysis system may invoke JDBC APIs (e.g., ResultSetMetaData call) to get the metadata information (e.g., column names, column order) for the data obtained from each data source. In some embodiments, the processing performed 804 and 806 may be performed as part of the processing performed in 808.

At 806, a check is made to see if the single source queries were successfully validated. If it is determined in 806 that validation fails for one or more single source queries then processing may be terminated. Validation for a single source query may fail, for example, if the syntax of the single source query is incorrect, if the single source query was unable to access the data source or retrieve information from the data source, if there were access permission errors, and the like. If it is determined in 806 that the single source queries received in 802 were successfully validated, then processing continues with 808.

At 808, the data analysis system generates a base combined query based upon the multiple single source queries and the metadata retrieved in 804. A base combined query is generated such that the result of executing the base combined query is equivalent to the combination of the results of executing the multiple single source queries that are used for generating the combined query. Examples of base combined queries are shown and described above (e.g., base combined queries for the Sales Region and Compensation examples).

As part of the processing in 808, the data analysis system may also perform some normalization analysis, which may include determining commonalities between the metadata attributes for the different data sources corresponding to the single source queries. The data analysis system may use different techniques to determine equivalency or commonality between the metadata attributes (e.g., columns) of the data sources. In certain embodiments, this information may be provided by the user. For example, in one embodiment, the data analysis system may display the columns of the multiple data sources to the user. The user may then indicate which columns are equivalent. This commonality or equivalency information and the mapping provided by the user is then used by the data analysis system to generate a base combined query that reflects the equivalency and mapping information. For example, in certain embodiments, data analysis system may use aliases (e.g., using the "AS" clause in SQL) to show the equivalencies. Other techniques may also be used.

At 810, the base combined query generated in 808 is executed by the data analysis system. Execution of the base combined query causes a result set to be obtained that includes data extracted from multiple data sources. In certain embodiments, data analysis system may use a JDBC call to execute the base combined query. Additionally, JDBC APIs (e.g., ResultSetMetaData call) may be invoked to get the metadata information (e.g., column names, column order) for the base combined query.

The result set obtained from executing the base combined query in 810 may be stored as a memory object (also referred to as a virtual data object) in a memory of the data analysis system. A base combined query may combine multiple single source queries. When the base combined query is executed, each of these single source queries may be executed and data extracted from a corresponding data source (e.g., a corresponding view (the view itself may be based upon one or more tables in a database)). In certain embodiments, the virtual data object may contain data fields (or columns) corresponding to result set data received due to the underlying single source queries and their corresponding data sources. The virtual data object may provide support for various APIs and may be based upon the schema of the underlying base combined query. In this manner, the virtual memory object is not hardwired to the code but instead is dynamically created based upon the base combined query.

At 812, the data analysis system determines the metadata for the result set. For example, if the result set is stored as a table or view, the metadata associated with the result set may include metadata attributes such as a table or view name, number of columns in the table or view, the names of the columns, the data types associated with the columns, and the like. In some embodiments, the processing in 812 may be performed as part of the processing in 810.

At 814, one or more of the metadata attributes determined in 812 may be output to the user. This may be done to enable the user to specify the analysis to be performed on the result set using the metadata attributes. For example, as shown in FIG. 3A and described above, information regarding the columns of the result set may be output to enable the user to select measures and dimensions for the analysis to be performed to determine aggregated monthly sales information per region.

At 816, the data analysis system may receive inputs from the user specifying the analysis to be performed. The information received in 816 may be referred to as analysis information that is indicative of the analysis that the user desires to perform using the result set obtained from executing the base combined query in 810. In certain embodiments, the user may specify the analysis information using one or more the metadata attributes output to the user in 814. For example, the user may select one or more of columns (e.g., select the columns to be used as dimensions or measures for the analysis), specify functions (e.g., SUM, AVG) to be applied to one or more columns, define time series data, specify a type of visualization to be used for outputting the analysis result set, and the like.

At 818, the data analysis system generates a modified combined query using the base combined query generated in 808 and the analysis information received in 816. In certain embodiments, the modified combined query includes the base combined query and additionally include code (e.g., SQL) implementing the analysis to be performed on the result set. Multiple examples of modified combined queries have been described above.

As previously indicated, the same base query may be used as the basis for multiple modified combined queries, each modified combined query corresponding to a particular analysis to be performed. Accordingly, the result set obtained from executing the base combined query may be the subject of various different analyses specified by the user.

At 820, the modified combined query generated in 818 is executed to obtain an analysis result set. The analysis result set represents the result of the analysis requested by the user.

At 822, the analysis result set may be output to the user. There are different ways in which the analysis result set may be output to the user. The analysis result set information may be output as a table, text, a visualization, and the like. For example, as described with respect to the Sales Region example, the analysis results may be displayed to the user as a line graph. Accordingly, as part of 822, a visualization may be generated based upon the analysis result set and based upon user-specified criteria for the visualization (e.g., the measures and dimension to be plotted along particular axes, any aggregation operators to be applied, etc.). The generated visualization may then be output to the user, for example, via a GUI displayed on a display device. In some embodiments, certain actions may be performed at 822 based upon the analysis result set data. In some embodiments, the analysis result set may also be provided as a Representational State Transfer (REST) API.

Figure 9:
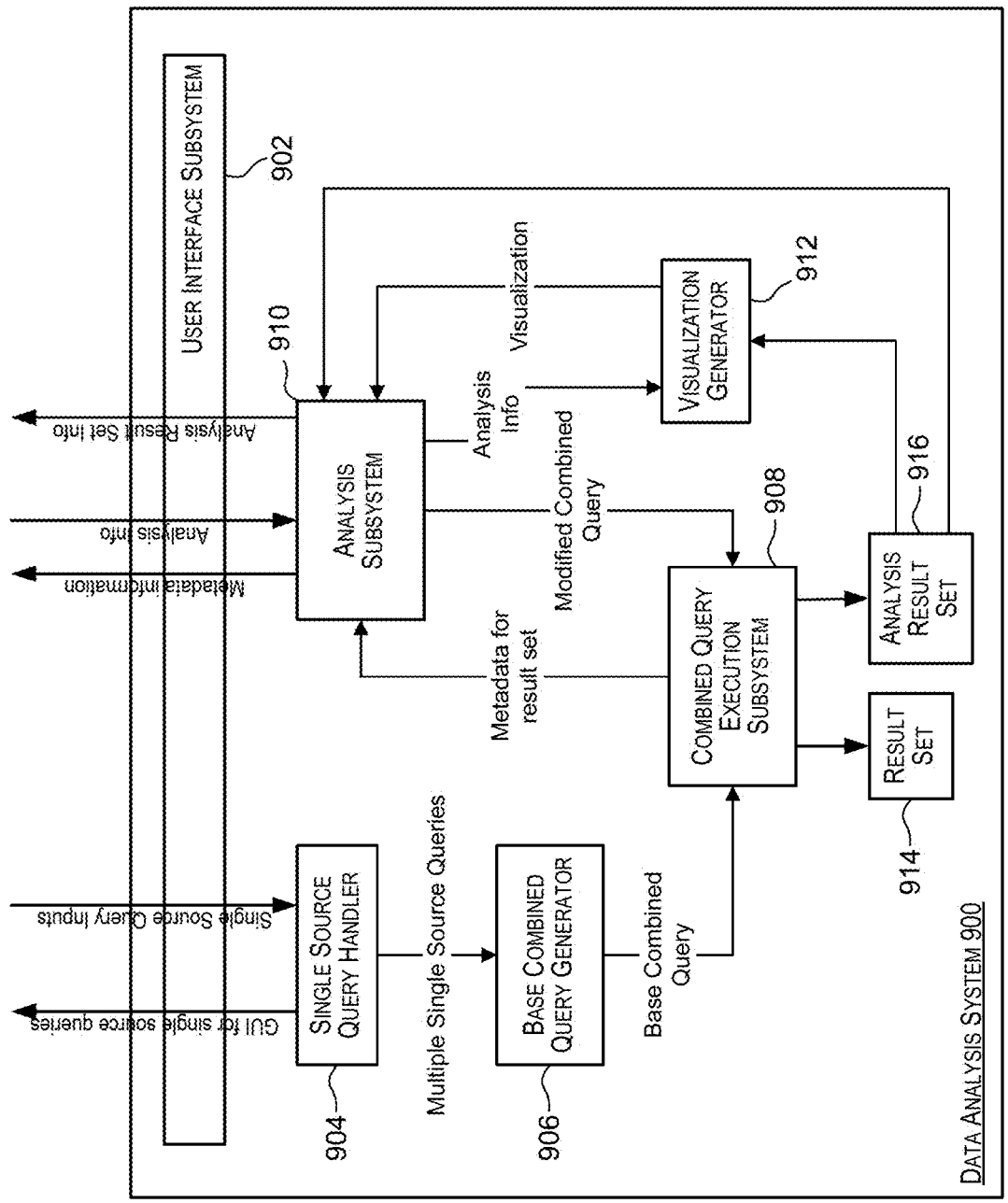
FIG. 9 depicts a high level diagram of a data analysis system according to certain embodiments.

FIG. 9 depicts a high level diagram of a data analysis system 900 according to certain embodiments. As shown in FIG. 9, data analysis system 900 comprises several subsystems or modules including a user interface subsystem 902, a single source query handler subsystem 904, a base combined query generator subsystem 906, a combined query execution subsystem 908, an analysis subsystem 910, and a visualization generator subsystem 912. These subsystems may be implemented in software (e.g., program code, instructions executable by a processor), in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, or combinations thereof). Data analysis system 900 depicted in FIG. 9 is merely an example and is not intended to unduly limit the scope of inventive embodiments recited in the claims. One of ordinary skill in the art would recognize many possible variations, alternatives, and modifications. For example, in some implementations, data analysis system 900 may have more or fewer subsystems than those shown in FIG. 9, may combine two or more subsystems, or may have a different configuration or arrangement of subsystems.

User interface subsystem 902 provides an interface that enables a user to interact with data analysis system 900. User interface subsystem 902 is configured to output information generated by data analysis system 900 to a user and to receive inputs from the user and provide the inputs to data analysis system 900. For example, GUIs displayed by data analysis system 900 may be generated and output by user interface subsystem 902. For example, the various GUIs depicted in FIGS. 2, 3A, and 3B may be output to the user using user interface subsystem 902. Results obtained from executing base combined queries or modified combined queries may also be output to the user using user interface subsystem 902.

User interface subsystem 902 also enables a user to provide inputs to data analysis system 900. These inputs may then be forwarded by user interface subsystem 902 to other appropriate subsystems within data analysis system 900 for further processing. For example, a user may provide information related to data sources, single source queries, and analysis information to data analysis system 900 via user interface subsystem 902.

In certain embodiments, single source query handler subsystem 904 is configured to handle processing related to generation of single source queries. For example, single source query handler subsystem 904 may receive information identifying data sources and corresponding single source queries from a user and provide the information to base combined query generator subsystem 906 for further processing.

In certain embodiments, single source query handler subsystem 904 may be configured to automatically generate single source queries based upon user-provided inputs. For example, single source query handler subsystem 904 may, given a user-selected data source, determine the metadata attributes associated with the data source. The metadata attributes may then be displayed to the user via user interface subsystem 902. The user may then select the metadata attributes (e.g., columns) of interest to the user and single source query handler subsystem 904 may be configured to automatically generate a single source query based upon the user provided inputs.

In some other embodiments, single source query handler subsystem 904 may allow a user to enter a single source query manually or in an ad-hoc manner. The single source queries may then be forwarded to base combined query generator subsystem 906 for generation of a base combined query.

Base combined query generator subsystem 906 is configured to generate a base combined query based upon the multiple single source queries received from single source query handler subsystem 904. Base combined query generator subsystem 906 may then forward a generated base combined query to combined query execution subsystem 908 for execution. In certain embodiments, before generating a base combined query based upon multiple single source queries, base combined query generator 906 may be configured to validate each of the single source queries to be combined by executing the single source queries. Base combined query generator subsystem 906 may then proceed with generation of a base combined query only after successful validation of all the multiple single source queries that are to be combined by the base combined query.

In certain embodiments, combined query execution subsystem 908 is configured to execute base combined queries and modified combined queries. The base combined queries may be received from base combined query generator subsystem 906. Combined query execution subsystem 908 may be configured to execute a base combined query and store the resulting result set 914 as a virtual memory object (e.g., the result set may be stored as a memory object in system runtime memory (e.g., RAM)). Combined query execution subsystem 908 may also be configured to determine the metadata associated with the result set. In certain embodiments, combined query execution subsystem 908 may provide the retrieved metadata information to analysis subsystem 910, which may then output the information to the user via user interface subsystem 902.

In certain embodiments, execution of the base combined query causes combined query execution subsystem 908 to connect to the different data sources identified in the base combined query and to extract data from these data sources. Additionally, metadata attributes related to the data sources (e.g., column name, label, type, and/or any other metadata associated with the result set of the given combined query) may also be retrieved. In some implementations, combined query execution subsystem 908 may be configured with appropriate drivers for communicating with the data sources.

In certain embodiments, combined query execution subsystem 908 may be configured to execute modified combined queries received from analysis subsystem 910. An analysis result set obtained from execution of a modified combined query may be stored in memory of the data analysis system. Combined query execution subsystem 908 may forward the analysis result set to analysis subsystem 910, which may then display the results to the user via user interface subsystem 902. If a visualization is to be generated, the analysis result set 916 may be forwarded to a visualization generator subsystem 912 that is configured to generate the requested visualization (e.g., a line graph as described earlier in the Sales Region example).

In certain embodiments, analysis subsystem 910 is responsible for handling processing related to generation of modified combined queries. Analysis subsystem 910 may receive metadata attributes information for a result set from combined query execution subsystem 908 and cause one or more of the metadata attributes to be displayed to the user using user interface subsystem 902. For example, analysis subsystem 910 may cause the metadata information for a result set to be displayed as shown in FIG. 3A and described above.

Analysis subsystem 910 is also configured to receive analysis information from a user. For example, as shown in FIG. 3A and described above, a user may provide inputs with respect to the result set metadata attributes indicating the analysis that the user wants to perform on the result set. These user inputs specifying the analysis information may be received by analysis subsystem 910. Analysis subsystem 910 is then configured to generate a modified combined query based upon the analysis information. Multiple modified combined queries may be generated for different kinds of analysis for the same result set.

Analysis subsystem 910 may then forward the modified combined queries to combined query execution subsystem 908 for execution. Combined query execution subsystem 908 may forward the analysis result set obtained from executing a modified combined query to analysis subsystem 910. Analysis subsystem 910 may then cause the analysis result set information to be output to the user via user interface subsystem 902.

In some instances, if a visualization is to be generated as part of the analysis, combined query execution subsystem 908 may forward the analysis result set to visualization generator subsystem 912. Visualization generator subsystem 912 may also receive analysis information from analysis subsystem 910 that is relevant for the generation of the visualization. For example, if the user has provided specific information relevant to the visualization (e.g., the dimensions and measures to be plotted along the different axes, time period to be used for generating the time series graph, one or more operators (e.g., COUNT, SUM, MAX, MIN, AVG) to be applied to the result set, ranges of values to be plotted)), then that information may be provided to visualization generator subsystem 912 by analysis subsystem 910. Visualization generator subsystem 912 may then generate the requisite visualization and forward the generated visualization to analysis subsystem 910. Analysis subsystem 910 may then cause the visualization to be output to the user via user interface subsystem 902.

Parameterization

In some implementations, the combined queries describe above, including base combined queries and the modified combined queries, may be parameterized. Parameterization enables the queries to include parameters, instead of set values, where the parameters can be substituted with actual values at runtime. For example, at runtime, values provide by a user, for example, via a dashboard, may be dynamically assigned to the parameters in the queries. At runtime, the query parameters in the queries are substituted with values provided for the parameters and the queries are executed using the substituted values. Such parameter substitution lends itself to specifying different types of parameters as well as allowing for the addition of new parameter types in the future. Parameterization allows filters to be applied efficiently when using combined queries, including base and modified combined queries.

In certain embodiments, the following syntax is used for specifying a parameter substitution. This enables different types of parameters to be specified and also allows for the addition of new parameter types. The general syntax in certain embodiments is as follows:

$[type(option, . . . )]

As shown above, the parameter substitution indicators are bracketed with $[ ] allowing them to be substituted (parsed) without any knowledge of the syntax of the SQL in which they are embedded. The "type" indicates the type of parameter substitution and the ( ) contains an optional list of qualifying options depending on parameter type.

A number of different types of parameterizations may be used in conjunction with combined queries. Three examples of parameterization types are described below. These however are not intended to be limiting. In alternative embodiments, various other types may be provided.

(1) Simple Parameter Type

This parameter substitution indicates that the value of the referenced parameter should be substituted. The value of a parameter can be a single value or a comma delimited list of values depending on the parameter definition. The type of the substitution is specified with the keyword "parm" and a single option of the parameter name.

$[parm(parameter name)]

(2) DataObject Name Type

This parameter substitution indicates that the database view name (e.g. BEAM_VIEW_14) for the specified DataObject name is to be substituted. The DataObject may be a database view, the name of which may not be known at design time. This DataObject substitution indicator allows the user to use the actual DataObject name and provides the information to the data analysis system to allow it to perform the requisite permission checks at runtime. This allows use of more complex database schemas that use flex tables.

$[do(dataobject name)]

(3) Row Level Security Type

This parameter substitution indicates that the row level security filter for the specified DataObject is to be substituted. This allows the user to place row level security filters at the most efficient location when the combined query contains sub-queries.

$[rls(dataobject name)]

FIG. 10 illustrates an example of a parameterized base combined query 1000 according to certain embodiments. When a modified combined query is generated based upon the base combined query, the underlying database view that represents FilmSales is inserted in the FilmSales parameter, and security filters added belonging to FilmSales. When the query is executed for a chart in a dashboard, the Region and State parameter values are taken from the dashboard UI (e.g., based upon inputs from a user). Combined query 1000 uses multiple different parameter types. As shown in FIG. 10, the $[do] parameter type allows a user to directly reference the FilmSales DataObject by name. It also allows the data analysis system to easily check DataObject permissions at runtime. The $[rls] parameter type allows the user to place the row level security filter for the FilmSales DataObject at the exact desired position in the SQL statement. The $[parm] parameter type allows the user to build custom filters at the exact desired position in the SQL query statement.

The functionalities provided by a data analysis system, as described above, can be implemented in various different environments including a cloud environment (could be various types of clouds including private, public, and hybrid cloud environments), on-premises environment, a hybrid environment, and the like.

Figure 12:
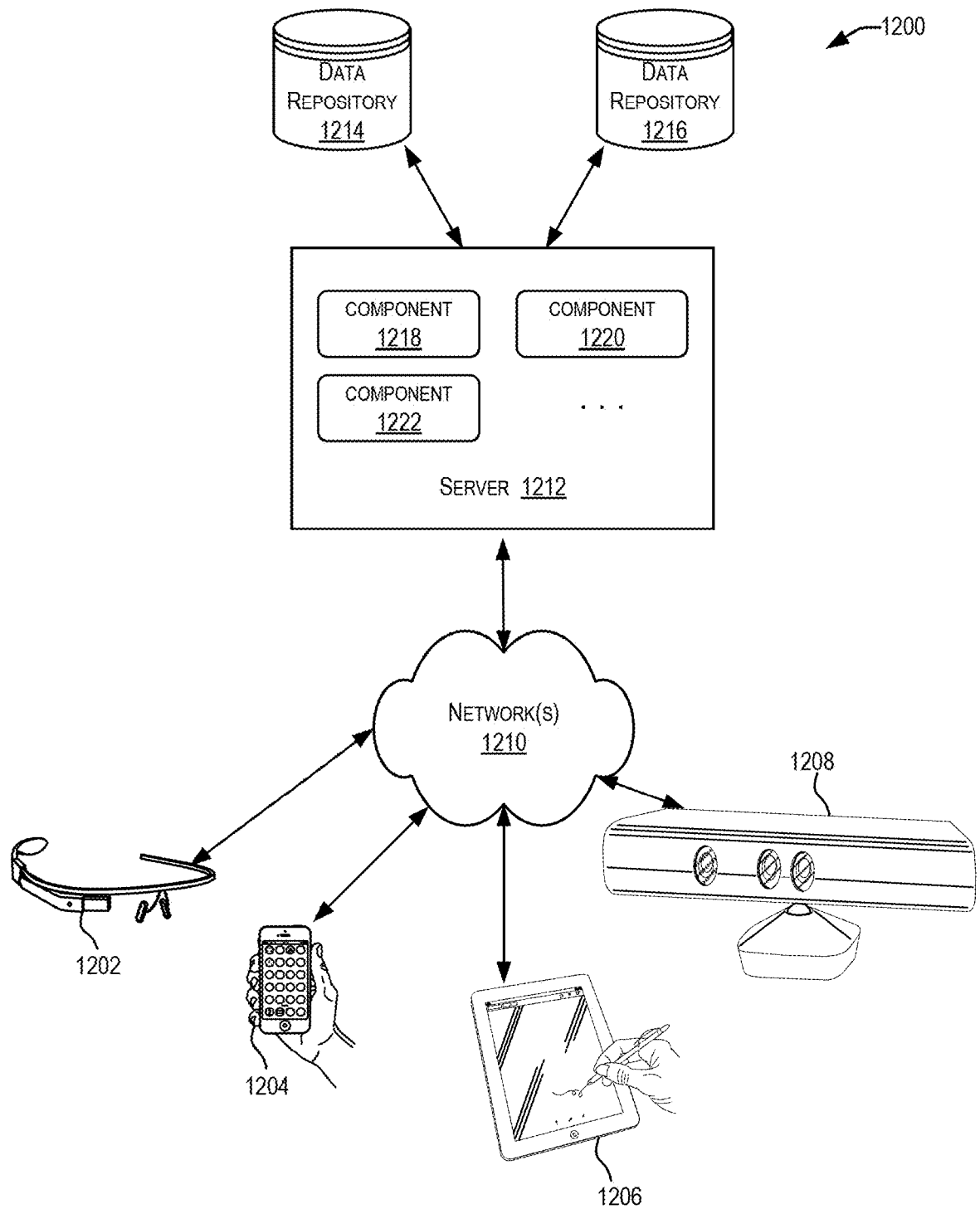
FIG. 12 depicts a simplified diagram of a distributed system for implementing an embodiment.

FIG. 12 depicts a simplified diagram of a distributed system 1200 for implementing an embodiment. In the illustrated embodiment, distributed system 1200 includes one or more client computing devices 1202, 1204, 1206, and 1208, coupled to a server 1212 via one or more communication networks 1210. Clients computing devices 1202, 1204, 1206, and 1208 may be configured to execute one or more applications.

In various embodiments, server 1212 may be adapted to run one or more services or software applications that provide the functionality of a data analysis system described herein. For example, a user of a client computing device may wish to perform data analysis on data stored across multiple data sources. In certain embodiments, server 1212 may receive information identifying the multiple data sources and corresponding single source queries from a client computing device, and generate a base combined query combining the multiple single source queries. Server 1212 may also receive analysis information and generate one or more modified combined queries based upon the analysis information and upon the underlying base combined query. Server 1212 may then cause the modified combined query to be executed and resultant analysis result set may then be output to the user using an output device of the user's computing device. In certain instances, server 1212 may be configured to generate a visualization based upon the analysis result set and output the visualization to the user.

In certain embodiments, server 1212 may also provide other services or software applications that can include non-virtual and virtual environments. In some embodiments, these services may be offered as web-based or cloud services, such as under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in FIG. 12, server 1212 may include one or more components 1218, 1220 and 1222 that implement the functions performed by server 1212. These components may include software components that may be executed by one or more processors, hardware components, or combinations thereof. It should be appreciated that various different system configurations are possible, which may be different from distributed system 1200. The embodiment shown in FIG. 12 is thus one example of a distributed system for implementing an embodiment system and is not intended to be limiting.

Users may use client computing devices 1202, 1204, 1206, and/or 1208 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 12 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm) OS®. Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1210 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1210 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1212 can include one or more virtual machines running virtual operating systems, or other computing architectures involving virtualization such as one or more flexible pools of logical storage devices that can be virtualized to maintain virtual storage devices for the server. In various embodiments, server 1212 may be adapted to run one or more services or software applications that provide the functionality described in the foregoing disclosure.

The computing systems in server 1212 may run one or more operating systems including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more data repositories 1214, 1216. These data repositories may be used to store data and other information in certain embodiments. For example, one or more of the data repositories 1214, 1216 may be used to store the data sources. Data repositories 1214, 1216 may reside in a variety of locations. For example, a data repository used by server 1212 may be local to server 1212 or may be remote from server 1212 and in communication with server 1212 via a network-based or dedicated connection. Data repositories 1214, 1216 may be of different types. In certain embodiments, a data repository used by server 1212 may be a database, for example, a relational database, such as databases provided by Oracle Corporation® and other vendors. One or more of these databases may be adapted to enable storage, update, and retrieval of data to and from the database in response to SQL-formatted commands.

Figure 13:
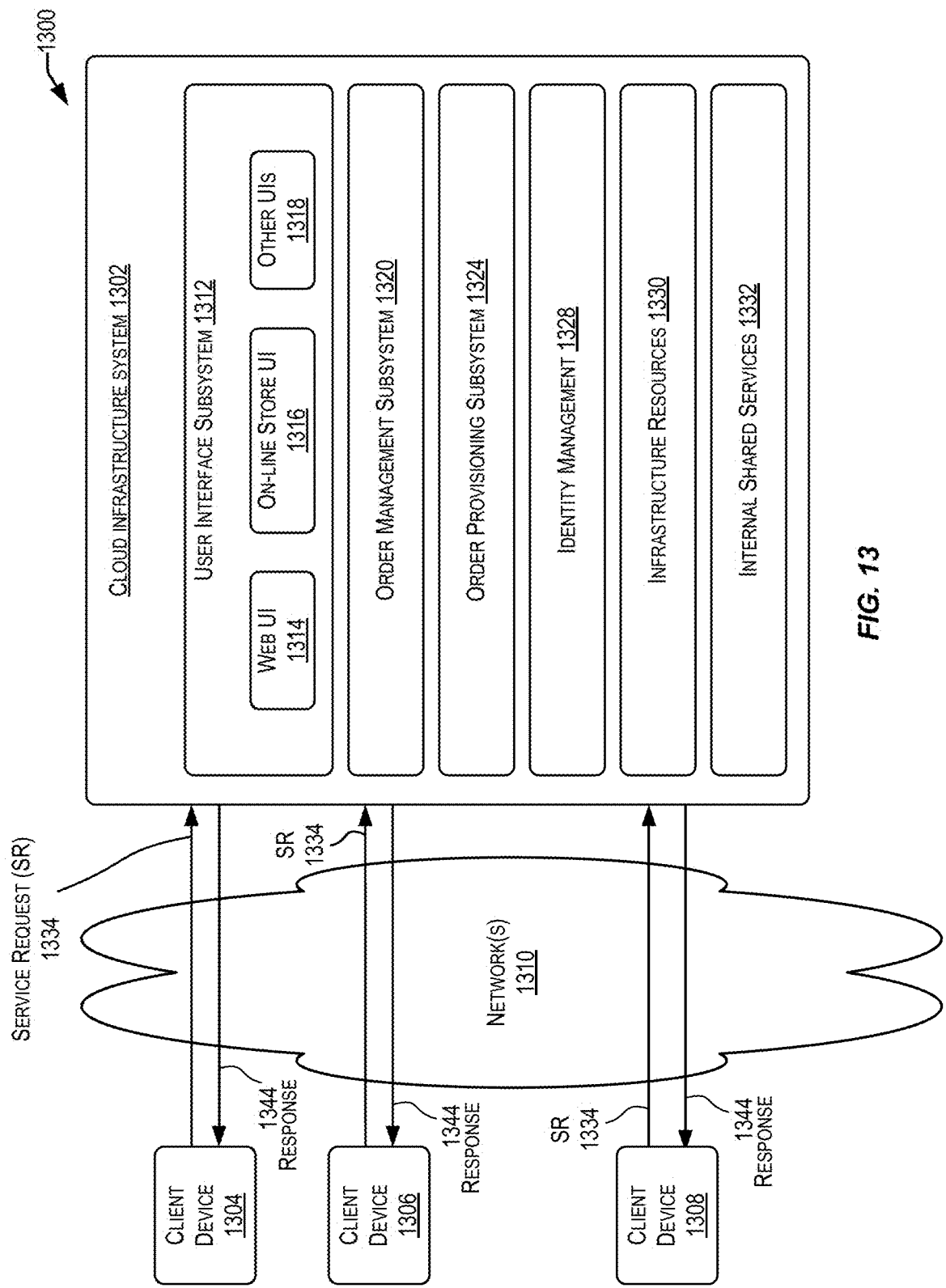
FIG. 13 is a simplified block diagram of a cloud-based system environment in which analysis services may be offered as cloud services, in accordance with certain embodiments.

In certain embodiments, the data analysis functionalities described in this disclosure may be offered as services via a cloud environment. FIG. 13 is a simplified block diagram of a cloud-based system environment in which analysis services may be offered as cloud services, in accordance with certain embodiments. In the embodiment depicted in FIG. 13, cloud infrastructure system 1302 may provide one or more cloud services that may be requested by users using one or more client computing devices 1304, 1306, and 1308. Cloud infrastructure system 1302 may comprise one or more computers and/or servers that may include those described above for server 1212. The computers in cloud infrastructure system 1302 may be organized as general purpose computers, specialized server computers, server farms, server clusters, or any other appropriate arrangement and/or combination.

Network(s) 1310 may facilitate communication and exchange of data between clients 1304, 1306, and 1308 and cloud infrastructure system 1302. Network(s) 1310 may include one or more networks. The networks may be of the same or different types. Network(s) 1310 may support one or more communication protocols, including wired and/or wireless protocols, for facilitating the communications.

The embodiment depicted in FIG. 13 is only one example of a cloud infrastructure system and is not intended to be limiting. It should be appreciated that, in some other embodiments, cloud infrastructure system 1302 may have more or fewer components than those depicted in FIG. 13, may combine two or more components, or may have a different configuration or arrangement of components. For example, although FIG. 13 depicts three client computing devices, any number of client computing devices may be supported in alternative embodiments.

The term cloud service is generally used to refer to a service that is made available to users on demand and via a communication network such as the Internet by systems (e.g., cloud infrastructure system 1302) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1302 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1302 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1302. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1302. Cloud infrastructure system 1302 then performs processing to provide the services requested in the customer's subscription order. For example, a user may request the cloud infrastructure system to register an application, as described above, and provide storage-related services to the application per the application's specified storage-related requirements. Cloud infrastructure system 1302 may be configured to provide one or even multiple cloud services.

Cloud infrastructure system 1302 may provide the cloud services via different deployment models. In a public cloud model, cloud infrastructure system 1302 may be owned by a third party cloud services provider and the cloud services are offered to any general public customer, where the customer can be an individual or an enterprise. In certain other embodiments, under a private cloud model, cloud infrastructure system 1302 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1302 and the services provided may be shared by several organizations in a related community. Various other models such as hybrids of the above mentioned models may also be used.

Client computing devices 1304, 1306, and 1308 may be of different types (such as devices 1202, 1204, 1206, and 1208 depicted in FIG. 12) and may be capable of operating one or more client applications. A user may use a client device to interact with cloud infrastructure system 1302, such as to request a data analysis service provided by cloud infrastructure system 1302. For example, a user may use a client device to request a service that enables the user to perform analysis of data stored across multiple data sources as described in this disclosure.

In some embodiments, the processing performed by cloud infrastructure system 1302 for providing storage-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 13, cloud infrastructure system 1302 may include infrastructure resources 1330 that are utilized for facilitating the provision of various cloud services offered by cloud infrastructure system 1302. Infrastructure resources 1330 may include, for example, processing resources, storage or memory resources, networking resources, and the like.

In certain embodiments, to facilitate efficient provisioning of these resources for supporting the various cloud services provided by cloud infrastructure system 1302 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1302 may itself internally use services 1332 that are shared by different components of cloud infrastructure system 1302 and which facilitate the provisioning of services by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1302 may comprise multiple subsystems. These subsystems may be implemented in software, or hardware, or combinations thereof. As depicted in FIG. 13, the subsystems may include a user interface subsystem 1312 that enables users or customers of cloud infrastructure system 1302 to interact with cloud infrastructure system 1302. User interface subsystem 1312 may include various different interfaces such as a web interface 1314, an online store interface 1316 where cloud services provided by cloud infrastructure system 1302 are advertised and are purchasable by a consumer, and other interfaces 1318. For example, a customer may, using a client device, request (service request 1334) one or more services provided by cloud infrastructure system 1302 using one or more of interfaces 1314, 1316, and 1318. For example, a customer may access the online store, browse cloud services offered by cloud infrastructure system 1302, and place a subscription order for one or more services offered by cloud infrastructure system 1302 that the customer wishes to subscribe to. The service request may include information identifying the customer and one or more services that the customer desires to subscribe to. For example, a customer may place a subscription order for data analysis-related service offered by cloud infrastructure system 1302.

In certain embodiments, such as the embodiment depicted in FIG. 13, cloud infrastructure system 1302 may comprise an order management subsystem (OMS) 1320 that is configured to process the new order. As part of this processing, OMS 1320 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1320 may then invoke the order provisioning subsystem (OPS) 1324 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1324 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1302 may send a response or notification 1344 to the requesting customer to indicate when the requested service is ready for use. In some instances, information (e.g., a link) may be sent to the customer that enables the customer to start using and availing the benefits of the requested services. In certain embodiments, for a customer requesting data analysis-related service, the response may include a link that enables that user to specify multiple data sources and start providing inputs as discussed above.

Cloud infrastructure system 1302 may provide services to multiple customers. For each customer, cloud infrastructure system 1302 is responsible for managing information related to one or more subscription orders received from the customer, maintaining customer data related to the orders, and providing the requested services to the customer. Cloud infrastructure system 1302 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1302 may provide services to multiple customers in parallel. Cloud infrastructure system 1302 may store information for these customers, including possibly proprietary information. In certain embodiments, cloud infrastructure system 1302 comprises an identity management subsystem (IMS) 1328 that is configured to manage customers information and provide the separation of the managed information such that information related to one customer is not accessible by another customer. IMS 1328 may be configured to provide various security-related services including identity services, such as information access management, authentication and authorization services, services for managing customer identities and roles and related capabilities, and the like.

Figure 14:
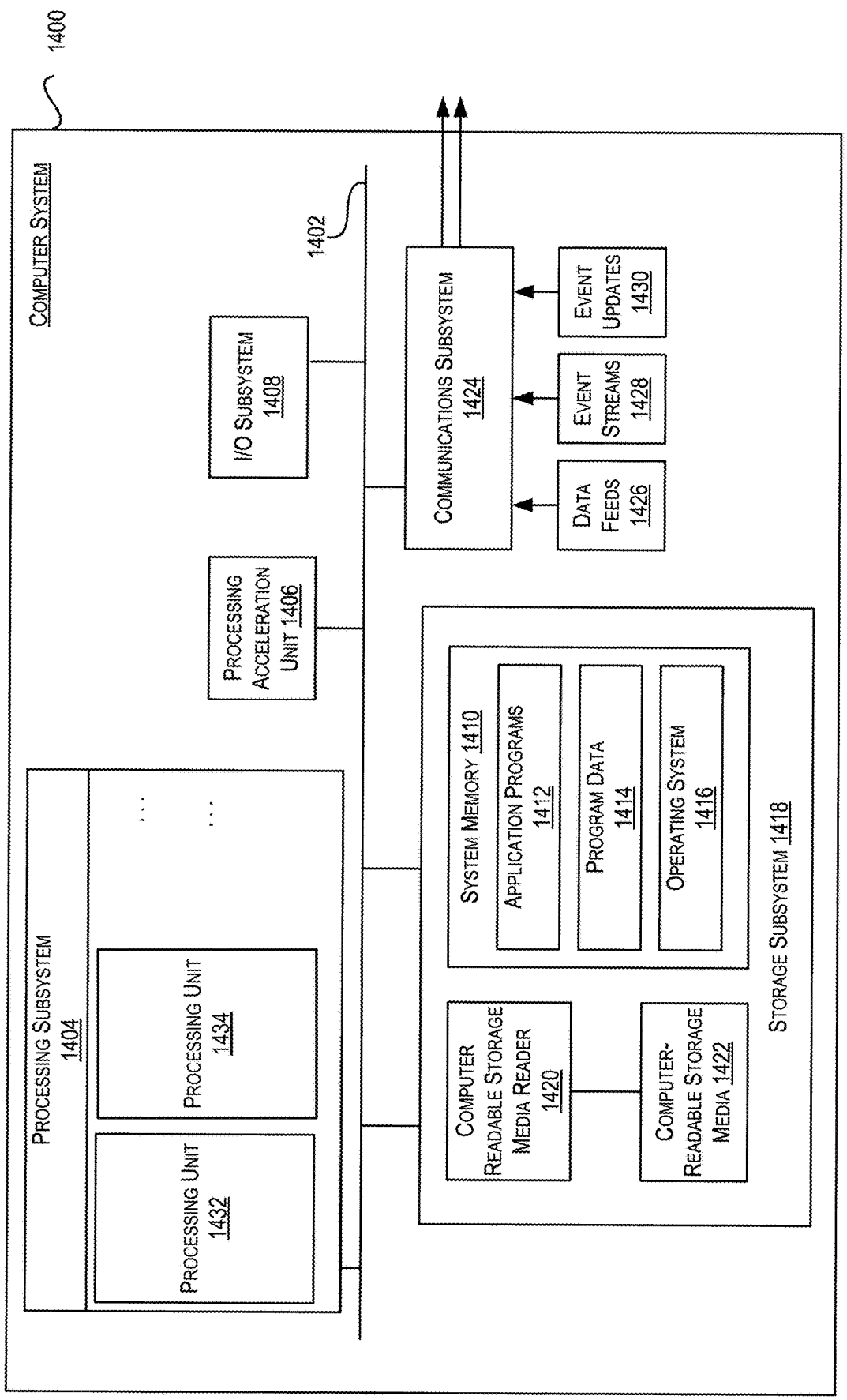
FIG. 14 illustrates an exemplary computer system that may be used to implement certain embodiments.

FIG. 14 illustrates an exemplary computer system 1400 that may be used to implement certain embodiments. For example, in some embodiments, computer system 1400 may be used to implement any of the systems depicted in FIG. 7. For example, computer system 1400 may be used to implement a data analysis system, a user system, and the like. Computer system 1400 may also be used to implement a system that stores one or more data sources. As shown in FIG. 14, computer system 1400 includes various subsystems including a processing subsystem 1404 that communicates with a number of other subsystems via a bus subsystem 1402. These other subsystems may include a processing acceleration unit 1406, an I/O subsystem 1408, a storage subsystem 1418, and a communications subsystem 1424. Storage subsystem 1418 may include non-transitory computer-readable storage media including storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1404 controls the operation of computer system 1400 and may comprise one or more processors, application specific integrated circuits (ASICs), or field programmable gate arrays (FPGAs). The processors may be single core or multicore processors. The processing resources of computer system 1400 can be organized into one or more processing units 1432, 1434, etc. A processing unit may include one or more processors, one or more cores from the same or different processors, a combination of cores and processors, or other combinations of cores and processors. In some embodiments, processing subsystem 1404 can include one or more special purpose co-processors such as graphics processors, digital signal processors (DSPs), or the like. In some embodiments, some or all of the processing units of processing subsystem 1404 can be implemented using customized circuits, such as application specific integrated circuits (ASICs), or field programmable gate arrays (FPGAs).

In some embodiments, the processing units in processing subsystem 1404 can execute instructions stored in system memory 1410 or on computer readable storage media 1422. In various embodiments, the processing units can execute a variety of programs or code instructions and can maintain multiple concurrently executing programs or processes. At any given time, some or all of the program code to be executed can be resident in system memory 1410 and/or on computer-readable storage media 1422 including potentially on one or more storage devices. Through suitable programming, processing subsystem 1404 can provide various functionalities described above. In instances where computer system 1400 is executing one or more virtual machines, one or more processing units may be allocated to each virtual machine.

In certain embodiments, a processing acceleration unit 1406 may optionally be provided for performing customized processing or for off-loading some of the processing performed by processing subsystem 1404 so as to accelerate the overall processing performed by computer system 1400.

I/O subsystem 1408 may include devices and mechanisms for inputting information to computer system 1400 and/or for outputting information from or via computer system 1400. In general, use of the term input device is intended to include all possible types of devices and mechanisms for inputting information to computer system 1400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1400 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1418 provides a repository or data store for storing information and data that is used by computer system 1400. Storage subsystem 1418 provides a tangible non-transitory computer-readable storage medium for storing the basic programming and data constructs that provide the functionality of some embodiments. Storage subsystem 1418 may store software (e.g., programs, code modules, instructions) that when executed by processing subsystem 1404 provides the functionality described above. The software may be executed by one or more processing units of processing subsystem 1404. Storage subsystem 1418 may also provide a repository for storing data used in accordance with the teachings of this disclosure.

Storage subsystem 1418 may include one or more non-transitory memory devices, including volatile and non-volatile memory devices. As shown in FIG. 14, storage subsystem 1418 includes a system memory 1410 and a computer-readable storage media 1422. System memory 1410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1400, such as during start-up, may typically be stored in the ROM. The RAM typically contains data and/or program modules that are presently being operated and executed by processing subsystem 1404. For example, in certain embodiments, a virtual data object storing a result set obtained from executing a base combined query may be stored in the RAM. An analysis result set obtained from executing a modified combined query may also be stored in the RAM in certain embodiments. In some implementations, system memory 1410 may include multiple different types of memory, such as static random access memory (SRAM), dynamic random access memory (DRAM), and the like.

By way of example, and not limitation, as depicted in FIG. 14, system memory 1410 may load application programs 1412 that are being executed, which may include various applications such as Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1422 may store programming and data constructs that provide the functionality of some embodiments. Computer-readable media 1422 may provide storage of computer-readable instructions, data structures, program modules, and other data for computer system 1400. Software (programs, code modules, instructions) that, when executed by processing subsystem 1404 provides the functionality described above, may be stored in storage subsystem 1418. By way of example, computer-readable storage media 1422 may include non-volatile memory such as a hard disk drive, a magnetic disk drive, an optical disk drive such as a CD ROM, DVD, a Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1418 may also include a computer-readable storage media reader 1420 that can further be connected to computer-readable storage media 1422. Reader 1420 may receive and be configured to read data from a memory device such as a disk, a flash drive, etc.

In certain embodiments, computer system 1400 may support virtualization technologies, including but not limited to virtualization of processing and memory resources. For example, computer system 1400 may provide support for executing one or more virtual machines. In certain embodiments, computer system 1400 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1400. Accordingly, multiple operating systems may potentially be run concurrently by computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to establish a communication channel to one or more client devices via the Internet for receiving and sending information from and to the client devices. For example, the communication subsystem may be used to facilitate communications between user systems, a data analysis system, and systems storing data sources.

Communication subsystem 1424 may support both wired and/or wireless communication protocols. For example, in certain embodiments, communications subsystem 1424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

Communication subsystem 1424 can receive and transmit data in various forms. For example, in some embodiments, in addition to other forms, communications subsystem 1424 may receive input communications in the form of structured and/or unstructured data feeds 1426, event streams 1428, event updates 1430, and the like. For example, communications subsystem 1424 may be configured to receive (or send) data feeds 1426 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1424 may be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to communicate data from computer system 1400 to other computer systems or networks. The data may be communicated in various different forms such as structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1400 depicted in FIG. 14 is intended only as a specific example. Many other configurations having more or fewer components than the system depicted in FIG. 14 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a computer system, (i) a first single source query for extracting first data from a first data source and (ii) a second single source query for extracting second data from a second data source,
   executing, by the computer system, the first query and the second query to retrieve respectively a set of metadata attributes for the first data source and a set of metadata attributes for the second data source;
   generating, by the computer system, a base combined query based on the first single source query, the second single source query, the set of metadata attributes for the first data source, and the set of metadata attributes for the second data source;
   executing, by the computer system, the base combined query to obtain a result set comprising the first data and the second data;
   receiving, by the computer system, analysis information identifying analysis to be performed on the result set;

generating, by the computer system, a modified combined query based upon the base combined query and the analysis information; and executing, by the computer system, the modified combined query to obtain a analysis result set.

2. The method of claim 1, wherein the generating the base combined query comprises normalizing a first metadata attribute from the set of metadata attributes retrieved for the first data source with a second metadata attribute from the set of metadata attributes retrieved for the second data source.

3. The method of claim 2, wherein the normalizing comprises:

determining the first metadata attribute has commonality with the second metadata attribute;

generating a mapping between the first metadata attribute and the second metadata attribute based on the determined commonality; and adding mapping information to the base combined query indicative based on the mapping.

4. The method of claim 1, further comprising:

receiving, by the computer system, additional or alternative analysis information identifying analysis to be performed on the result set;

generating, by the computer system, another modified combined query based upon the base combined query and the additional or alternative analysis information; and executing, by the computer system, the another modified combined query to obtain another analysis result set.

5. The method of claim 1, further comprising:

determining, by the computer system, a set of metadata attributes for the result set; and outputting, by the computer system, the set of metadata attributes for the result set, wherein:

receiving the analysis information comprises receiving information indicating selection of a metadata attribute from the set of metadata attributes for the result set; and the modified combined query is generated based upon the base combined query and the analysis information including the metadata attribute.

6. The method of claim 1, further comprising:

generating, by the computer system, a visualization based on the analysis result set and user-specified criteria for the visualization; and outputting, by the computer system, the visualization to a client device.

7. The method of claim 1, wherein the first single source query and the second single source query are received from the client device.

8. A non-transitory computer-readable memory storing a plurality of instructions executable by one or more processors, the plurality of instructions comprising instructions that when executed by the one or more processors cause the one or more processors to perform processing comprising:

receiving (i) a first single source query for extracting first data from a first data source and (ii) a second single source query for extracting second data from a second data source, executing the first query and the second query to retrieve respectively a set of metadata attributes for the first data source and a set of metadata attributes for the second data source;

generating a base combined query based on the first single source query, the second single source query, the set of metadata attributes for the first data source, and the set of metadata attributes for the second data source;

executing the base combined query to obtain a result set comprising the first data and the second data;

receiving analysis information identifying analysis to be performed on the result set;

generating a modified combined query based upon the base combined query and the analysis information; and executing the modified combined query to obtain a analysis result set.

9. The non-transitory computer-readable memory of claim 8, wherein the generating the base combined query comprises normalizing a first metadata attribute from the set of metadata attributes retrieved for the first data source with a second metadata attribute from the set of metadata attributes retrieved for the second data source.

10. The non-transitory computer-readable memory of claim 9, wherein the normalizing comprises:

determining the first metadata attribute has commonality with the second metadata attribute;

generating a mapping between the first metadata attribute and the second metadata attribute based on the determined commonality; and adding mapping information to the base combined query indicative based on the mapping.

11. The non-transitory computer-readable memory of claim 8, further comprising:

receiving additional or alternative analysis information identifying analysis to be performed on the result set;

generating another modified combined query based upon the base combined query and the additional or alternative analysis information; and executing the another modified combined query to obtain another analysis result set.

12. The non-transitory computer-readable memory of claim 8, wherein the processing further comprises:

determining a set of metadata attributes for the result set; and outputting the set of metadata attributes for the result set, wherein:

receiving the analysis information comprises receiving information indicating selection of a metadata attribute from the set of metadata attributes for the result set; and the modified combined query is generated based upon the base combined query and the analysis information including the metadata attribute.

13. The non-transitory computer-readable memory of claim 8, wherein the processing further comprises:

generating a visualization based on the analysis result set and user-specified criteria for the visualization; and outputting the visualization to a client device.

14. The non-transitory computer-readable memory of claim 8, wherein the first single source query and the second single source query are received from the client device.

15. A system comprising:

one or more processors; and a memory coupled to the one or more processors, the memory storing a plurality of instructions executable by the one or more processors, the plurality of instructions comprising instructions that when executed by the one or more processors cause the one or more processors to perform processing comprising:

receiving (i) a first single source query for extracting first data from a first data source and (ii) a second single source query for extracting second data from a second data source, executing the first query and the second query to retrieve respectively a set of metadata attributes for the first data source and a set of metadata attributes for the second data source;

generating a base combined query based on the first single source query, the second single source query, the set of metadata attributes for the first data source, and the set of metadata attributes for the second data source;

executing the base combined query to obtain a result set comprising the first data and the second data;

receiving analysis information identifying analysis to be performed on the result set;

generating a modified combined query based upon the base combined query and the analysis information; and executing the modified combined query to obtain a analysis result set.

16. The system of claim 15, wherein the generating the base combined query comprises normalizing a first metadata attribute from the set of metadata attributes retrieved for the first data source with a second metadata attribute from the set of metadata attributes retrieved for the second data source.

17. The system of claim 16, wherein the normalizing comprises:
determining the first metadata attribute has commonality with the second metadata attribute;
generating a mapping between the first metadata attribute and the second metadata attribute based on the determined commonality; and
adding mapping information to the base combined query indicative based on the mapping.

18. The system of claim 15, further comprising:
receiving additional or alternative analysis information identifying analysis to be performed on the result set;
generating another modified combined query based upon the base combined query and the additional or alternative analysis information; and
executing the another modified combined query to obtain another analysis result set.

19. The system of claim 15, wherein the processing further comprises:
determining a set of metadata attributes for the result set; and
outputting the set of metadata attributes for the result set, wherein:
receiving the analysis information comprises receiving information indicating selection of a metadata attribute from the set of metadata attributes for the result set; and
the modified combined query is generated based upon the base combined query and the analysis information including the metadata attribute.

20. The system of claim 15, wherein the processing further comprises:
generating a visualization based on the analysis result set and user-specified criteria for the visualization; and
outputting the visualization to a client device.

* * * * *